(12) United States Patent
Arnott et al.

(10) Patent No.: US 12,061,998 B2
(45) Date of Patent: Aug. 13, 2024

(54) MANAGING PROJECTS IN A CONTENT MANAGEMENT SYSTEM

(71) Applicant: Dropbox, Inc., San Francisco, CA (US)

(72) Inventors: John Arnott, San Francisco, CA (US); Jacob Hurwitz, San Francisco, CA (US); Matthew Beaty, San Francisco, CA (US); Conor Woods, San Francisco, CA (US); Fanny Luor, San Francisco, CA (US); Steph Wang, San Francisco, CA (US); Neil Sethi, San Francisco, CA (US); Matthis Perrin, San Francisco, CA (US); Chris Baty, San Francisco, CA (US); Natalie Klotz, San Francisco, CA (US); Henry Liu, San Francisco, CA (US); Nebyat Teklu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 98 days.

(21) Appl. No.: 17/650,581

(22) Filed: Feb. 10, 2022

(65) Prior Publication Data

US 2022/0164743 A1    May 26, 2022

Related U.S. Application Data

(63) Continuation of application No. 15/283,199, filed on Sep. 30, 2016, now Pat. No. 11,282,008.

(51) Int. Cl.
*G06Q 10/00* (2023.01)
*G06Q 10/0631* (2023.01)
*G06F 3/0482* (2013.01)

(52) U.S. Cl.
CPC ....... *G06Q 10/06313* (2013.01); *G06Q 10/00* (2013.01); *G06Q 10/06316* (2013.01); *G06F 3/0482* (2013.01)

(58) Field of Classification Search
CPC ............. G06Q 10/06313; G06Q 10/00; G06Q 10/06316; G06Q 10/06395; G06Q 10/02;
(Continued)

(56) References Cited

U.S. PATENT DOCUMENTS 7,720,780 B1 * 5/2010 Heidenreich ............ G06N 5/02
706/45
8,209,211 B2   6/2012 Engle et al.
(Continued)

OTHER PUBLICATIONS

Ten Six, Quick Ways To Monitor Schedule Progress in Microsoft Project, Dec. 18, 2015, Ten Six, https://tensix.com/quick-ways-to-monitor-schedule-progress-in-microsoft-project/, p. 1-12. (Year: 2015).*
(Continued)

*Primary Examiner* — Joseph M Waesco
(74) *Attorney, Agent, or Firm* — Polsinelli PC

(57) ABSTRACT

Disclosed are systems, methods, and non-transitory computer-readable storage media for managing projects in a content management system. In some embodiments, a content management system can generate a graphical user interface that presents a centralized view of a project. For example, the project can include project members, content items, tasks assigned to project members, communications between project members and activity history for the project. The graphical user interface can present this project data (e.g., project members, content items, tasks, communications, activity, etc.) so that a project member can easily and quickly view multiple aspects of the project.

20 Claims, 15 Drawing Sheets

(58) Field of Classification Search
CPC ........ G06Q 10/06; G06Q 10/10; G06Q 30/02; G06F 3/0482; G05B 2219/31357
See application file for complete search history.

(56) References Cited

U.S. PATENT DOCUMENTS

| | | | | |
|---|---|---|---|---|
| 9,298,355 | B1* | 3/2016 | Beausoleil | G06F 16/252 |
| 2006/0041447 | A1* | 2/2006 | Vucina | G06Q 10/06311 |
| | | | | 705/7.21 |
| 2007/0006126 | A1* | 1/2007 | Calkins | G06Q 10/06 |
| | | | | 717/102 |
| 2007/0073719 | A1* | 3/2007 | Ramer | H04L 67/52 |
| 2007/0255713 | A1* | 11/2007 | Li | G06Q 10/06 |
| | | | | 707/999.009 |
| 2007/0255715 | A1* | 11/2007 | Li | G06Q 10/00 |
| 2007/0288292 | A1* | 12/2007 | Gauger | G06Q 10/063 |
| | | | | 405/9 |
| 2009/0083101 | A1* | 3/2009 | Wall | G06Q 10/06 |
| | | | | 705/7.15 |
| 2009/0083343 | A1* | 3/2009 | Wall | G06F 8/34 |
| 2010/0070328 | A1* | 3/2010 | Motoyama | G06Q 10/06 |
| | | | | 705/7.17 |
| 2012/0030264 | A1* | 2/2012 | Horn | G06F 16/285 |
| | | | | 707/821 |
| 2013/0073473 | A1* | 3/2013 | Heath | G06Q 30/0241 |
| | | | | 705/319 |
| 2013/0132162 | A1* | 5/2013 | Banerjee | G06Q 10/0637 |
| | | | | 705/7.36 |
| 2014/0047560 | A1* | 2/2014 | Meyer | G06F 21/62 |
| | | | | 726/28 |
| 2014/0193047 | A1* | 7/2014 | Grosz | G06Q 10/10 |
| | | | | 382/118 |
| 2014/0195921 | A1* | 7/2014 | Grosz | G06Q 30/0631 |
| | | | | 715/738 |
| 2014/0230076 | A1* | 8/2014 | Micucci | H04L 63/08 |
| | | | | 726/28 |
| 2014/0304618 | A1* | 10/2014 | Carriero | H04L 51/08 |
| | | | | 715/753 |
| 2014/0324596 | A1* | 10/2014 | Rodriguez | H05B 47/11 |
| | | | | 705/14.66 |
| 2014/0365961 | A1* | 12/2014 | Lefor | G06F 3/0482 |
| | | | | 715/810 |
| 2014/0380350 | A1* | 12/2014 | Shankar | H04N 21/25883 |
| | | | | 725/18 |
| 2015/0019480 | A1* | 1/2015 | Maquaire | G06F 16/2365 |
| | | | | 707/609 |
| 2015/0019559 | A1* | 1/2015 | Maquaire | G06F 16/907 |
| | | | | 707/740 |
| 2015/0120744 | A1* | 4/2015 | Horn | G06F 16/285 |
| | | | | 707/740 |
| 2016/0117071 | A1* | 4/2016 | Horn | G06F 3/04845 |
| | | | | 715/768 |
| 2016/0322082 | A1* | 11/2016 | Davis | H04W 8/22 |
| 2016/0353169 | A1* | 12/2016 | Miller | G06F 3/0482 |
| 2017/0041296 | A1* | 2/2017 | Ford | G06F 21/64 |
| 2017/0285879 | A1* | 10/2017 | Pilkington | G06F 40/174 |
| 2017/0337287 | A1* | 11/2017 | Gill | G06Q 10/06311 |
| 2018/0096273 | A1* | 4/2018 | Arnott | G06Q 10/06313 |
| 2018/0129371 | A1* | 5/2018 | Fowler | G06Q 10/1095 |
| 2019/0096267 | A1* | 3/2019 | Shamasundar | G08G 5/0052 |
| 2019/0147461 | A1* | 5/2019 | Sheppard | G06Q 30/0201 |
| | | | | 705/14.41 |
| 2023/0376557 | A1* | 11/2023 | Mancuso | G06F 3/0482 |

OTHER PUBLICATIONS

Advisory Action from U.S. Appl. No. 15/283,199, mailed Sep. 29, 2020, 3 pages.
Advisory Action from U.S. Appl. No. 15/283,199, mailed Jan. 10, 2020, 3 pages.
Final Office Action from U.S. Appl. No. 15/283,199, mailed Jul. 23, 2020, 31 pages.
Final Office Action from U.S. Appl. No. 15/283,199, mailed Oct. 4, 2019, 32 pages.
Final Office Action from U.S. Appl. No. 15/283,199, mailed Sep. 16, 2021, 27 pages.
International Search Report and Written Opinion for PCT Application No. PCT/US2017/049777 dated Oct. 23, 2017, 10 pages.
Non-Final Office Action from U.S. Appl. No. 15/283,199, mailed Mar. 5, 2020, 28 pages.
Non-Final Office Action from U.S. Patent Application No. 15/283.199, mailed Mar. 30, 2021, 12 pages.
Notice of Allowance from U.S. Appl. No. 15/283,199, mailed Dec. 14, 2021, 12 pages.
Tsai W.L., et al., "An Approach for Managing Project-Communicated Content," 2017 IEEE International Conference on Industrial Engineering and Engineering Management (IEEM), doi: 10.1109/IEEM .2017.8289988, 2017, pp. 735-739.

* cited by examiner

MANAGING PROJECTS IN A CONTENT MANAGEMENT SYSTEM

CROSS-REFERENCE TO RELATED APPLICATION INFORMATION

This is a continuation of U.S. patent application Ser. No. 15/283,199, filed Sep. 30, 2016, which is incorporated herein by reference in its entirety.

BACKGROUND

Project management is a difficult job and even though computers provide many tools to make project management easier, it is still difficult to keep track of project work flows (e.g., tasks), manage work product (e.g., documents, files, folders, content, etc.), and communicate effectively so that every member of a project can find information quickly and so that every member of a project knows exactly what they are supposed to be working on at any given time.

SUMMARY

Additional features and advantages of the disclosure will be set forth in the description which follows, and in part will be apparent from the description, or can be learned by practice of the herein disclosed principles. Various features and advantages of the disclosure can be realized and obtained through the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing projects in a content management system. In some embodiments, a content management system can generate a graphical user interface that presents a centralized view of a project. For example, the project can include project members (e.g., users, people, etc.), content items (e.g., documents, files, etc.), tasks assigned to project members, communications between members (e.g., comments, messages, etc.) and activity history for the project. The graphical user interface can present this project data (e.g., project members, content items, tasks, communications, activity, etc.) so that all aspects of the project can be easily and quickly viewed by a member of the project.

BRIEF DESCRIPTION OF THE DRAWINGS

The above-recited and other advantages and features of the disclosure will become apparent by reference to specific embodiments thereof which are illustrated in the appended drawings. One skilled in the art will recognize that these drawings depict example embodiments of the disclosure and are not therefore to be considered to be limiting of its scope. The principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a centralized mechanism for managing and presenting project data. For example, typical technologies for project management include multiple distinct systems that a user must operate and coordinate to perform project management tasks. For example, separate email systems, task managers, file systems, data sharing mechanisms, etc., often must be employed by the project manager and project members to coordinate tasks, share project files, determine schedules, and communicate with other project members. These separate systems, applications, communication mechanisms, etc., can consume a large amount of system resources (e.g., memory, CPU cycles, etc.) and/or network resources (e.g., bandwidth, data budgets, etc.) available to the project member's devices. By centralizing project management activities using the content management system and project management system features described herein, project management data (e.g., tasks, schedules, project files, messaging, etc.) can be shared among project members while reducing the amount of computing resources required to perform project management tasks. For example, the project member's devices consume fewer computing resources when performing project management tasks because the project member's devices no longer need to run multiple software applications to perform the tasks. Moreover, because the project data (e.g., tasks, files, schedules, etc.) is available from content management system 106, project member's devices do not need to download all of the project data and network bandwidth and device resources can be conserved. For example, the project members can simply access the project data from a shared location in the content management system without having to download all of the project data to each user's device. Moreover, by pushing most of the project management processing to the content management system servers, the project member's devices (e.g., user devices) are not burdened with storing, transmitting, and/or receiving large amounts of project data, as was required using prior project management systems.

Figure 1:
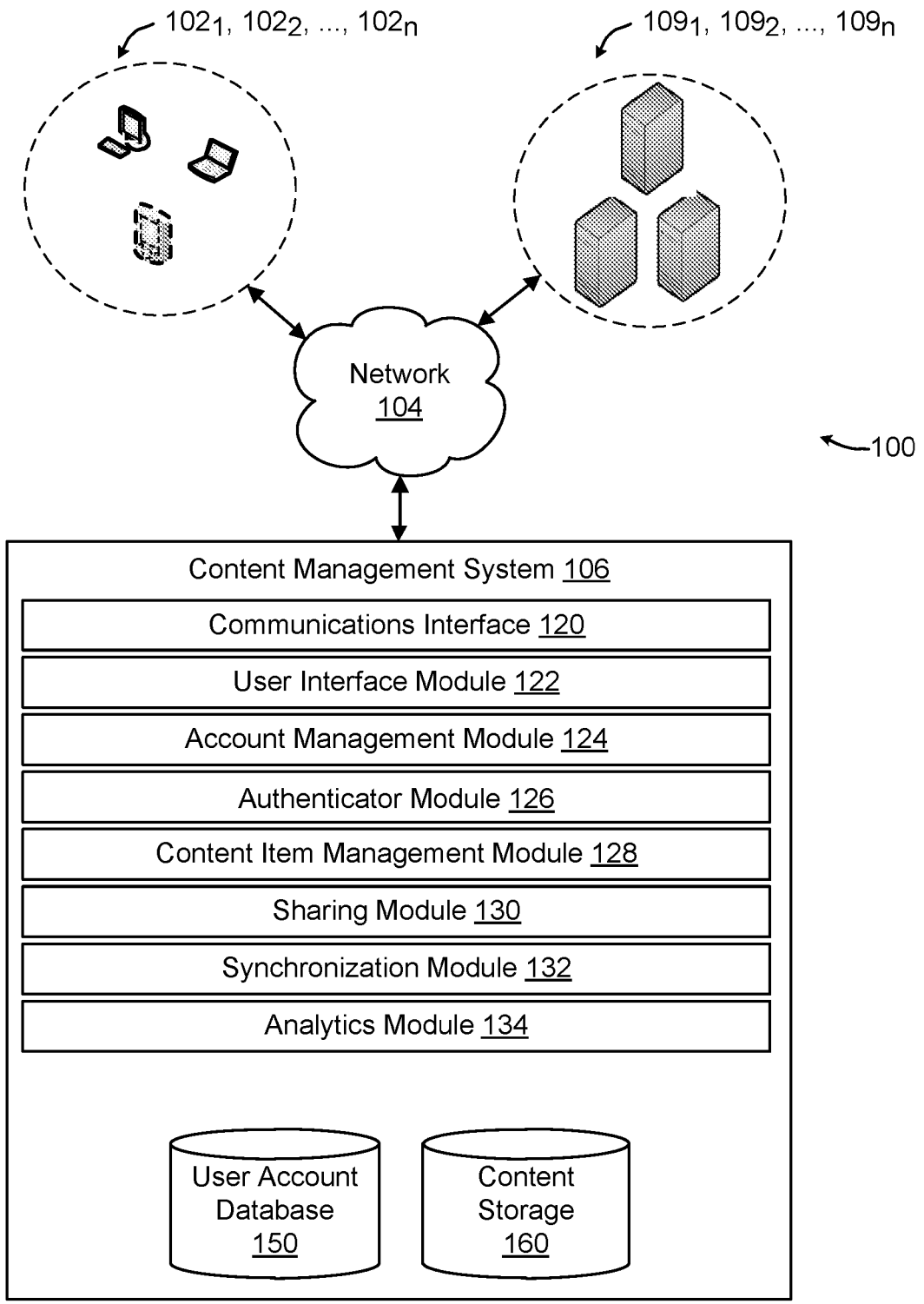
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_n$ (collectively "102") connected to network 104 by direct and/or indirect communication. Content management system 106 can include a single computing device (e.g., a server) or multiple computing devices (e.g., multiple servers) that are configured to perform the functions and/or operations that provide the services described herein. Content management system 106 can support connections from a variety of different client devices, such as: desktop computers; mobile computers; mobile communications devices, e.g. mobile phones, smart phones, tablets; wearable devices; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the content management system specific component can be a stand-alone application, one or more application plug-ins, and/or a browser extension. However, the user can also interact with content management system 106 via a third-party application, such as a web browser, that resides on client device $102_i$ and is configured to communicate with content management system 106. In various implementations, the client-side application can present a user interface (UI) for a user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g., various tiers of free or paid accounts), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of others in content management system 106.

An account can be used to store content items, such as digital data, documents, text files, audio files, image files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. Content storage 160 can store the metadata for a content item as part of the content item or separately from the content item. In some variations, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items with one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In some implementations of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content stored in a user account via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides authentication credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content item management module 128 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

In some embodiments, content management system 106 can include content item management module 128. For example, content item management module 128 can monitor content items managed by content management system 106 and collect and distribute state information describing the current user interaction state of the content items. For example, the interaction state can include activities that the user is performing or participating in relative to a content item. The interaction state can be, for example, that the user is viewing a content item, editing a content item, adding or has added a content item, or any other user interaction, as may be described below.

For example, content item management module 128 can monitor content items to determine which users are currently interacting with the content items and send this interaction information to content management system clients running on client devices 102$_i$. For example, when a user is interacting with a content item on a server device of content management system 106, content item management module 128 can monitor the interaction, generate state information describing the interaction, and send the interaction state information to content management system clients so that the interaction state information can be presented with the content items on the client device.

When a user is interacting with a content item on a client device 102$_i$, the content management system client running on client device 102$_i$ can monitor the interaction between the user of client device 102$_i$ and the content item. The content management system client can then report the interaction state to content item management module 128 (e.g., during synchronization). Content item management module 128 can then distribute the interaction state information to other content management system clients running on other client devices 102$_i$. For example, the interaction state information for a content item can be distributed as metadata for the content item when the content item (and metadata) is synchronized between content management system 106 and user devices 102$_i$. Thus, when a content item is shared amongst multiple users using different client devices 102$_i$, a content management system client running on client device 102$_1$ can present a representation of a content item along with interaction state information indicating that another user is viewing, editing, commenting on, or otherwise interacting with the same content item.

While content management system 106 is presented with specific components, it should be understood by one skilled in the art, that the architectural configuration of system 106 is simply one possible configuration and that other configurations with more or fewer components are possible.

Figure 2:
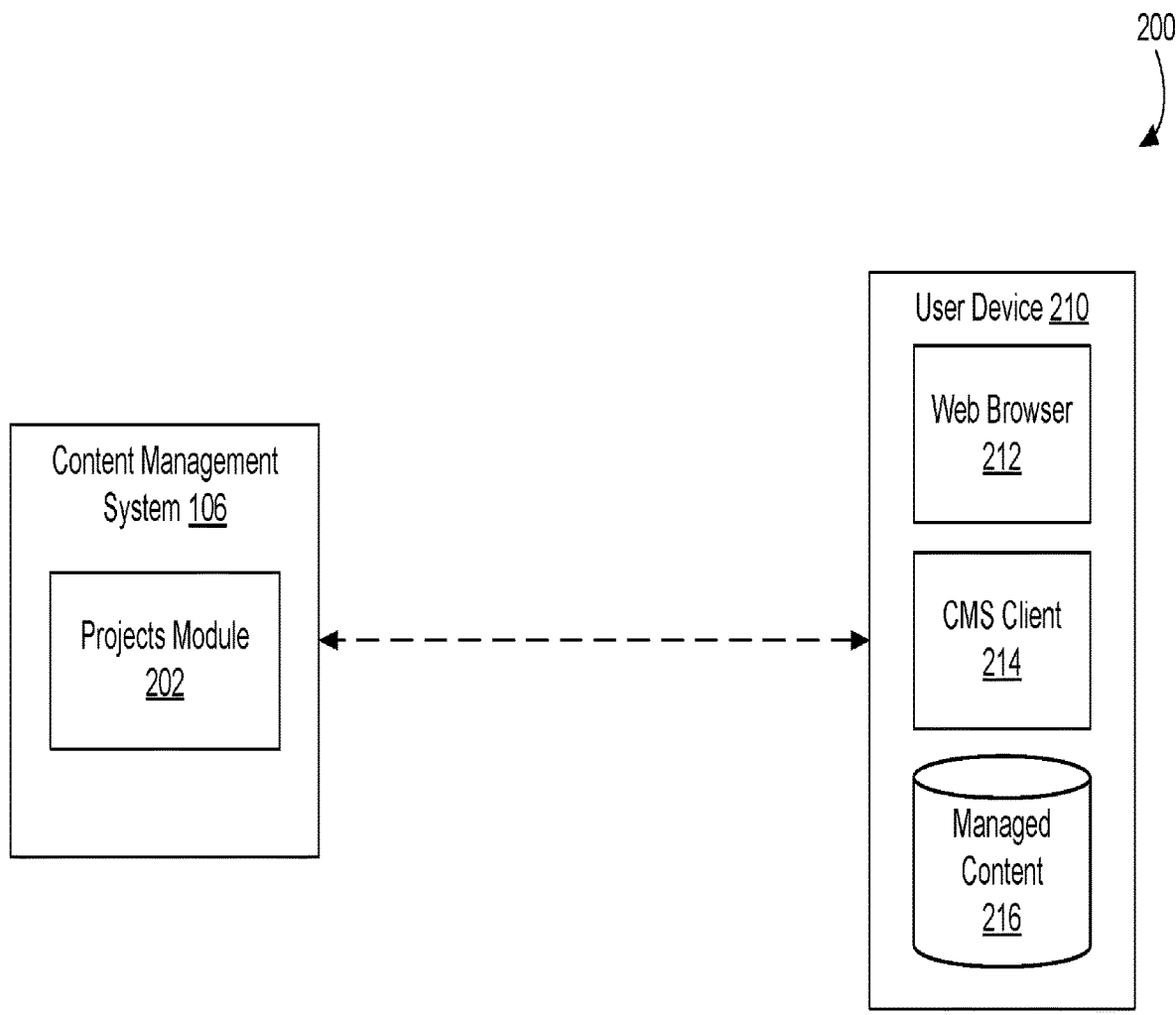
FIG. 2 is a block diagram of an example system for managing projects in a content management system.

FIG. 2 is a block diagram of an example project management system 200 for managing projects in a content management system. For example, system 200 can correspond to system configuration 100, as described above. Thus, system 200 can include content management system 106.

In some implementations, content management system 106 can include projects module 202. In various implementations, projects module 202 can manage project data, provide internal interfaces or application programming interfaces (APIs) for accessing project data, and/or generate graphical user interfaces (GUIs) for presenting project data on client devices 102$_i$. For example, project data (e.g., content items, information about project members, tasks, communications, etc.) managed by content management system 106 can be tagged with metadata (e.g., the project identifier) that associates the project data with a particular project. When a user provides input selecting a particular project to view, projects module 202 can search content management system 106 for project data having metadata that associates the project data with the particular project. For example, the metadata can include a name or identifier for the particular project.

Alternatively or additionally, the project management system can store project data managed by content management system 106 for a particular project in a project folder shared with one or more project members. Thus, in various implementations, content management system 106 and/or CMS client 214 can locate or obtain project data for a particular project by searching for content items having metadata that includes the project identifier for the particular project or by searching the shared folder corresponding to the particular project. After projects module 202 finds or determines the project data, projects module 202 can send the project data to a client device (e.g., client device 102$_1$). For example, projects module 202 can send the project data to client device 102$_1$ through an API to a native projects client application running on client device 102$_1$. Projects module 202 can send the project data to client device 102$_1$ (e.g., to a web browser running on client device 102$_1$) in a web page generated by projects module 202.

In some implementations, system 200 can include user device 210. For example, user device 210 can correspond to one of client devices 102 (e.g., client device 102$_i$), as described above. In some implementations, user device 210 can include web browser 212. For example, a user can interact with web browser 212 to view project data generated by projects module 202. Web browser 212 can receive input navigating web browser 212 to an address (e.g., URL) for projects module 202. Web browser 212 can receive a selection of a project (e.g., project identifier, project name, etc.) and send a corresponding project identifier to projects module 202. Projects module 202 can find project data associated with the project identifier, generate a web page that includes the project data, and send the web page to web browser 212. Web browser 212 can then present the web page and project data, as described in greater detail below.

In some implementations, user device 210 can include content management system (CMS) client 214. For example, CMS client 214 can correspond to the client-side application and/or client software for content management system 106 as described above with reference to FIG. 1. CMS client 214 can be, for example, a native client specifically built for interacting with content management system 106. CMS client 214 can be a web browser (e.g., web browser 212) or part of a web browser (e.g., an extension or plugin) that receives web pages, web applications, etc., from content management system 106. CMS client 214 can provide GUIs for presenting content management system data (e.g., project data, content items, etc.).

In some implementations, CMS client 214 can synchronize project data between content management system 106 (e.g., projects module 202) and managed content database 216. For example, managed content database 216 can be a file system, or other storage location managed by content management system 106 through CMS client 214. When project data changes, either locally on user device 210 or remotely on content management system 106, CMS client 214 can synchronize the project data so that the project data stored in managed content database 216 matches the project data stored by content management system 106. As described above, the project data can include project member data, content items, content item metadata, task data, communications (e.g., electronic messages between project members, comments on content items, etc.), activities performed, and/or other project data, as described below. Thus, CMS client 214 and/or web browser 212 can obtain project data remotely from projects module 202 through network 104 and/or locally from managed content database 216.

In some implementations, CMS client 214 can present project graphical user interfaces. For example, CMS client 214 may communicate with projects module 202 through APIs provided by projects module 202 to obtain project data. CMS client 214 can then generate native graphical user interfaces for presenting the projects data obtained from projects module 202, as described in greater detail below.

Figure 3:
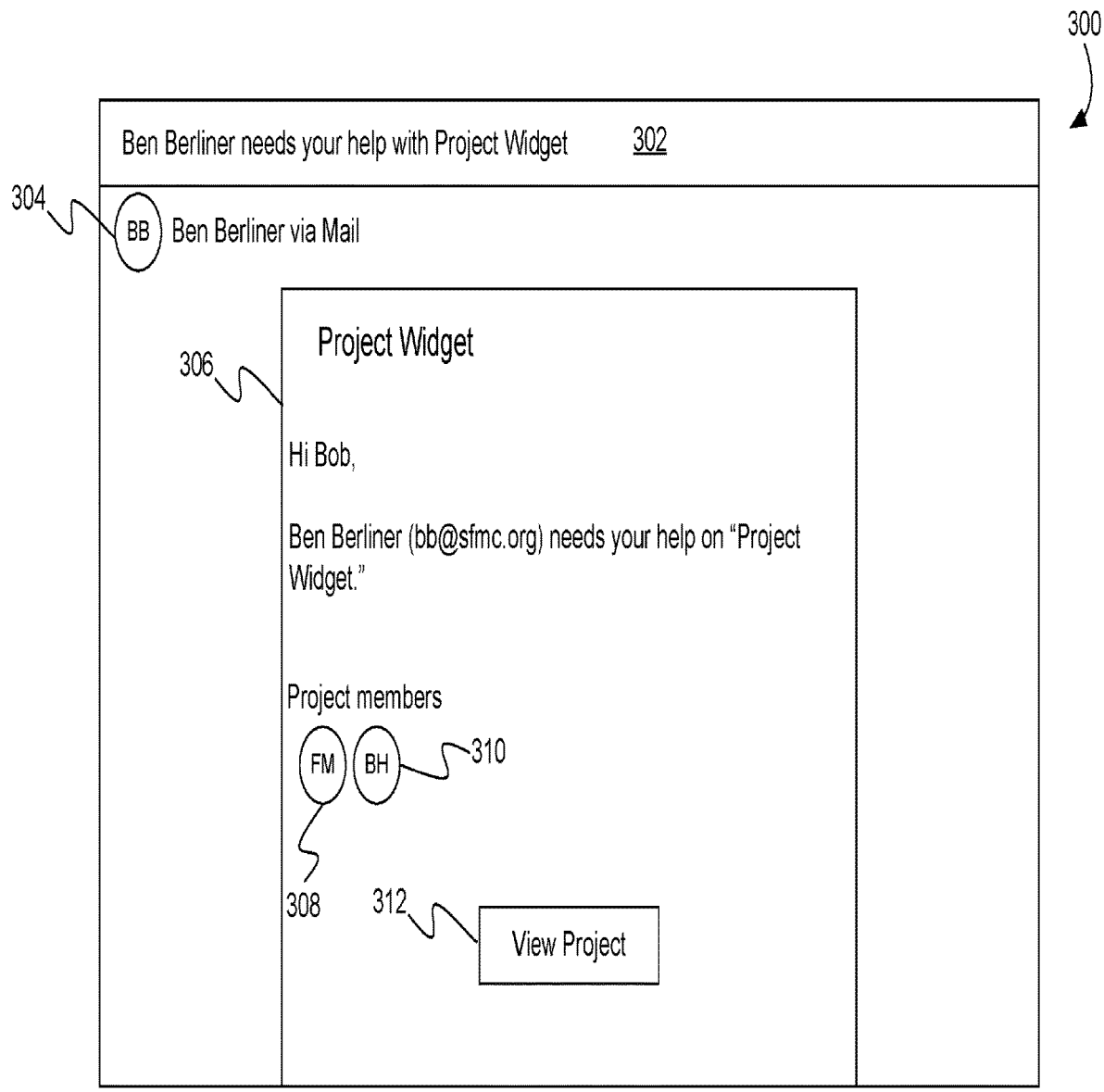
FIG. 3 illustrates an example graphical user interface for presenting a project invitation.

FIG. 3 illustrates an example graphical user interface 300 for presenting a project invitation. For example, GUI 300 can be presented by CMS client 214 (e.g., a native client, a web browser, etc.) on a display of user device 210. For example, when an existing project member (e.g., project owner, the project manager, project creator, etc.) wishes to add a new member (e.g., user, user account, group, participant, person, etc.) to an existing project, the existing project member can provide input to select the new member to add to the project and cause projects module 202 to send a message (e.g., email, text message, notification, etc.) to the selected member. In various implementations, the message can include GUI 300 or a link (e.g., uniform resource locator—URL, uniform resource identifier—URI, etc.) for the project. When the new member receives the message and/or selects the link, CMS client 214 on user device 210 can present GUI 300 on the display of user device 210 of the new member. For example, when CMS client 214 is a web browser, CMS client 214 can obtain a web page configured to present GUI 300, provided by project module 202. When CMS client 214 is a native application on user device 210, CMS client 214 can invoke APIs of projects module 202 to obtain projects data and present GUI 300.

In some implementations, GUI 300 can include title 302. For example, title 302 can include text and/or graphics that describe the purpose of GUI 300. For example, title 302 can display text indicating that the project manager is requesting the selected new member's help with a project.

In some implementations, GUI 300 can include an identifier 304 for the existing project member who sent the invitation to the selected new member. For example, identifier 304 can include a graphical representation of the existing project member and/or text identifying the exiting project member.

In some implementations, GUI 300 can include graphical element 306 describing the project to which the selected member was invited to join. For example, graphical element 306 can include a message inviting the selected new member to the project. Graphical element 306 can include graphical elements 308 and/or 310 identifying current project members. Graphical element 306 can include graphical element 312 for viewing additional details of the project. For example, if the selected new member wishes to see more information about the project, the selected new member can select graphical element 312 to invoke GUI 500 of FIG. 5.

Figure 4:
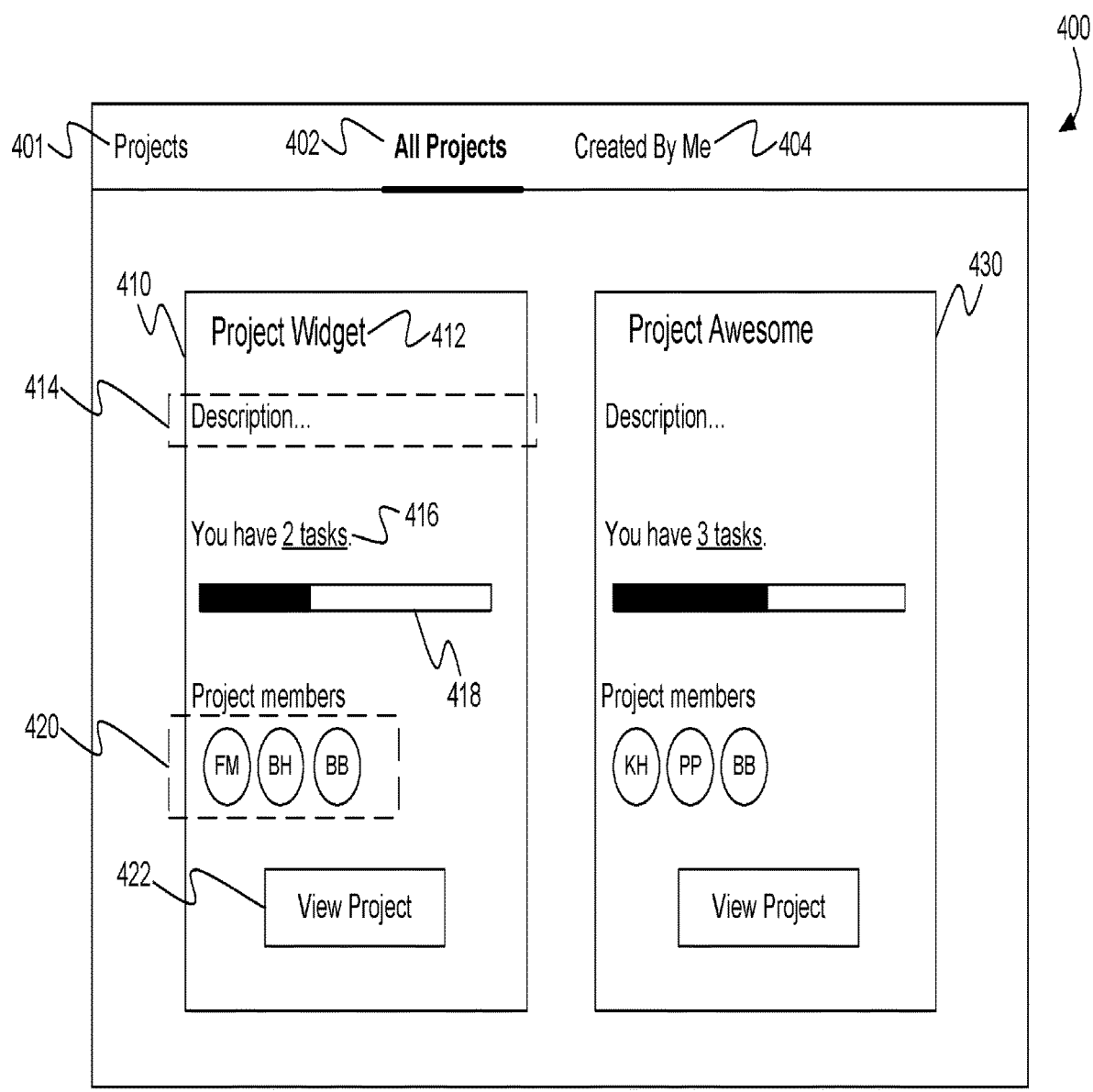
FIG. 4 illustrates an example graphical user interface for presenting a project browser.

FIG. 4 illustrates an example graphical user interface 400 for presenting a project browser. For example, GUI 400 can be presented by CMS client 214 on a display of user device 210. GUI 400 can be presented in response to the selection of graphical element 401 presented on any of the GUIs described herein, for example. A user can select graphical element 402 to cause GUI 400 to present all projects that an identified user account (e.g., a user account associated with a current session) is a member of. The user can select graphical element 404 to cause GUI 400 to present projects that the user created (e.g. projects for which the user is an owner or manager).

In some implementations, GUI 400 can present graphical representations (e.g., project cards) of different projects of which the user is a member. For example, GUI 400 can present graphical element 410 (e.g., a project card) representing a project named (e.g., identified as) "Project Widget." GUI 400 can present graphical element 430 (e.g., a project card) representing a project named "Project Awesome." Each project card (e.g., graphical element 410) can include a project name 412 and/or a project description 414.

In some implementations, some project cards can include graphical element 416 indicating a number of tasks that the user has been assigned for the corresponding project. For example, the number of tasks can represent the total number of tasks assigned to the user or the number of tasks the user has not completed yet. In some implementations, selection of graphical element 416 can cause CMS client 214 to present a graphical user interface that presents task information for the corresponding project, as described further below. In some implementations, some project cards can include graphical element 418 indicating the progress of tasks within the project. For example, graphical element 418 can be a progress bar that indicates the ratio of completed tasks to total tasks for the project.

In some implementations, some project cards can include graphical elements 420 representing users who are members of the corresponding project. For example, graphical elements 420 can include identifiers and/or images representing the members of the corresponding project (e.g., the project named "Project Widget"). When the user wishes to view more information about the project or work on items (e.g., content items, tasks, etc.) associated with the project, the user can select graphical element 422 to view the corresponding project. For example, when GUI 400 receives a selection of graphical element 422, CMS client 214 can present GUI 500 of FIG. 5.

Figure 5:
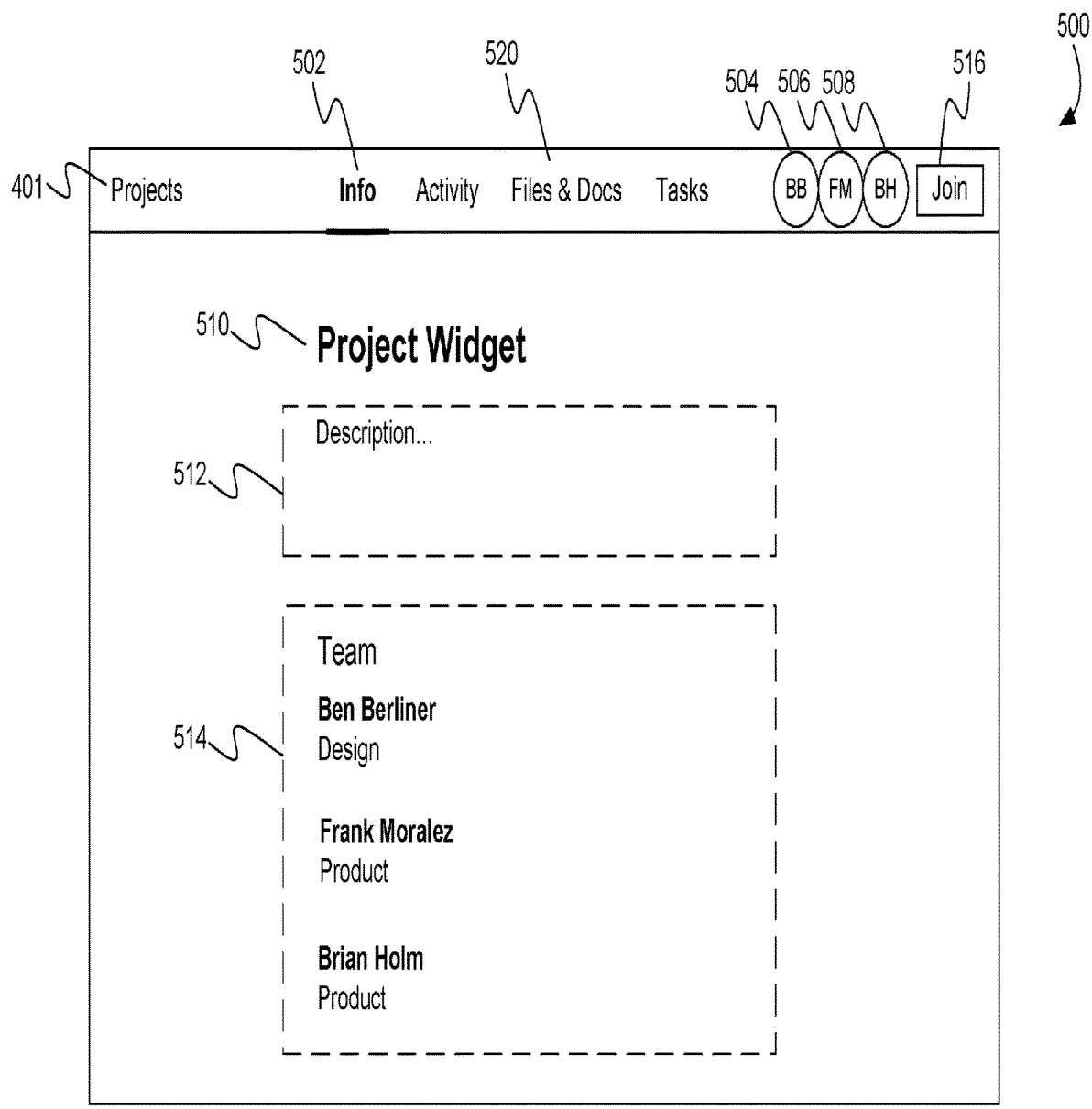
FIG. 5 illustrates an example graphical user interface for presenting a project overview.

FIG. 5 illustrates an example graphical user interface 500 for presenting a project overview. For example, CMS client 214 can present GUI 500 in response to receiving input selecting graphical element 312 of FIG. 3. CMS client 214 can present GUI 500 in response to receiving input selecting graphical element 422 of FIG. 4. CMS client 214 can present GUI 500 in response to receiving input selecting graphical element 502 of FIG. 5.

In some implementations, GUI 500 can present information describing a project. For example, the project can be a project that a user or user account has been invited to join. The project can be a project that the user is already a member. GUI 500 can be configured to provide project information to a user to aid in onboarding a new project member to the project.

In some implementations, GUI 500 can, for example, include graphical elements 504, 506, and/or 508 representing and/or identifying users who are already members of the project. GUI 500 can include project identifier 510 (e.g., the name of the project). GUI 500 can include project description 512. For example, project description 512 can include text, content items, graphical elements, links, etc., that provide a description of the project or resources to additional content items related to the project. Project description 512 can, for example, describe the project scope and other information about the project. GUI 500 can include team description 514. For example, team description 514 can include information identifying each of the project members and their roles and/or responsibilities on the project.

In some implementations, GUI 500 can include graphical element 516. For example, graphical element 516 can be a selectable element, such as a button, hyperlink, or the like. When the user is not already a member of the project, selection of graphical element 516 can cause content management system 106 to add the user to the project as a new member. When the user is already a member of the project, selection of graphical element 516 can provide an interface to invite others to join the project. For example, in response to receiving a selection of graphical element 516, GUI 500 can present graphical user interfaces that can receive input specifying new members to invite to join the project and graphical elements that provide an interface for sending messages to specified users inviting the specified users to join the project.

In some implementations, GUI 500 can present one or more project content items. For example, graphical elements 510, 512, and/or 514 can be content of a content item presented by GUI 500 to describe the project. A project content item can be a project overview document, file, image, or other type of content item. Selection of graphical element 520 can provide a to view of additional content items associated with the project (e.g., tagged with the project name or identifier).

Figure 6:
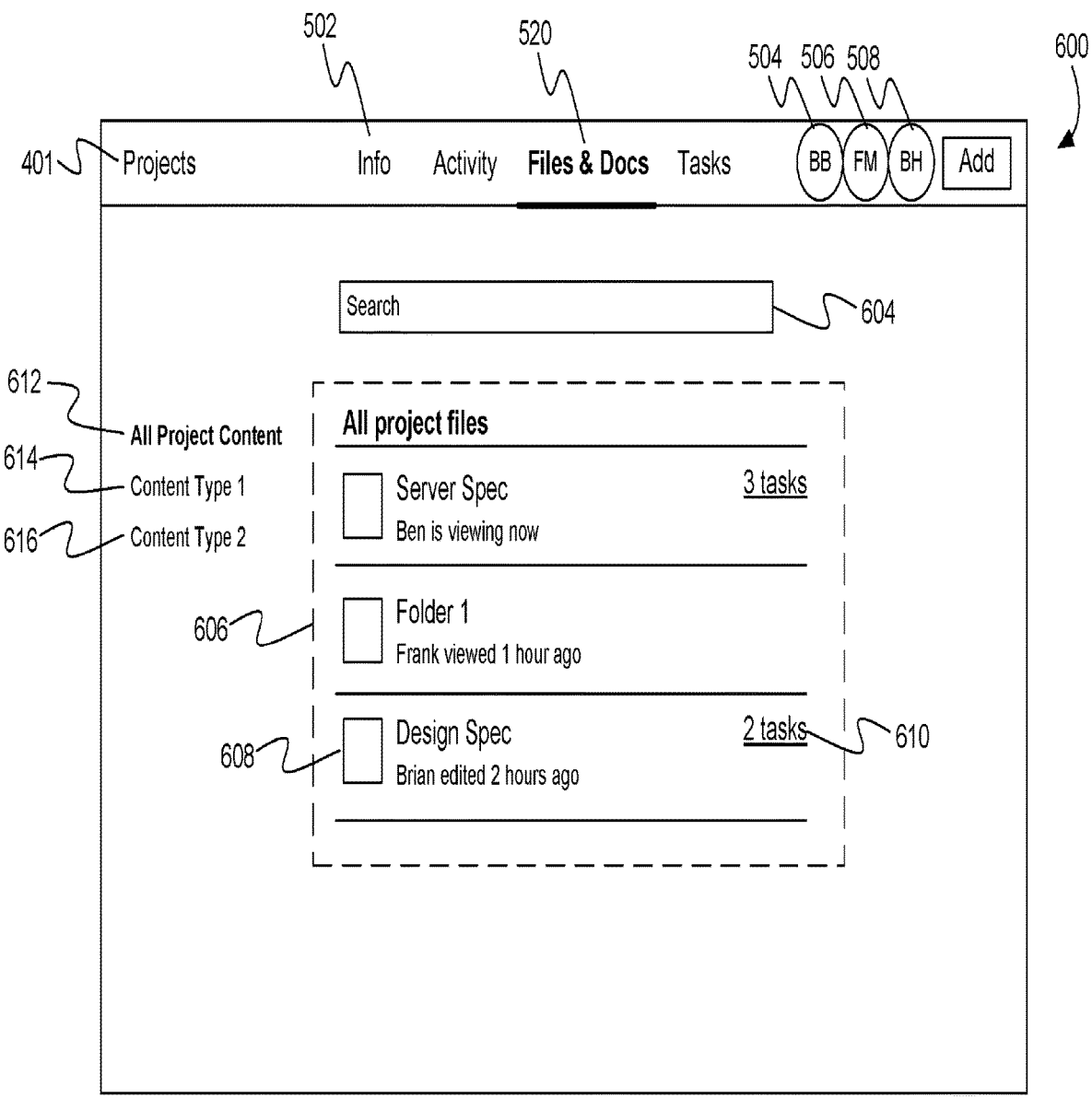
FIG. 6 illustrates an example graphical user interface for presenting content items associated with a project.

FIG. 6 illustrates an example graphical user interface 600 for presenting content items associated with a project. For example, CMS client 214 can present GUI 600 in response to receiving a selection of graphical element 520 of FIG. 5. For example, in response to receiving the selection of graphical element 520, CMS client 214 can search managed content database 216. This searching can locate content items associated with the selected project, e.g., based on the content items being tagged with the project identifier for the selected project. Alternatively or in addition, CMS client 214 can request content items associated with the selected project from content management system 106. Content management system 106 can search content storage 160 for content items tagged with the project identifier for the selected project and return the content items (e.g., the actual content items, links to the content items, metadata for the content items) to CMS client 214. As described above, content items can be tagged with the project identifier by storing the project identifier in metadata for the content items associated with the project. For example, whenever a content item is added to the project, CMS client 214 and/or content management system 106 can store the project identifier in the metadata for the added content item. When CMS client 214 determines or receives the content items associated with the project, CMS client 214 can present the content items on GUI 600.

In some implementations, GUI 600 can include graphical element 604 for initiating a search for content items based on specified parameters. For example, a user can select graphical element 604, provide text input specifying search parameters, and provide additional input (e.g., select a keyboard button, select a virtual button, etc.) to cause CMS client 214 to initiate a search for content items within the project (e.g., tagged with the project identifier) that correspond to the search parameters. For example, CMS client 214 can perform the search by searching managed content database 216. In some implementations, CMS client 214 can send a search request, including the search parameters, to content management system 106 to cause content management system 106 to search content storage 160 for content items within the project that correspond to the search parameters.

In some implementations, GUI 600 can include project content item area 606. For example, project content item area 606 can include representations of content items that are associated with the selected project. For example, project content item area 606 can include a listing of content items, including graphical representations of each content item, text identifying each content item, and/or status information for each content item. For example, the status information can include an identification of a project member and/or an action performed by the project member in relation to the corresponding content item.

In some implementations, content items in project content item area 606 can include task element 610. For example, the task element 610 can present the number of tasks associated with the corresponding content item. The number of tasks can represent a total number of tasks for the project associated with the content item. The number of tasks can represent a number of tasks remaining for the project associated with the content item. The number of tasks can represent a total number of tasks for the project assigned to a user and associated with the content item. The number of tasks can represent a number of tasks remaining for the project that are assigned to the user and associated with the content item. In some implementations, the user can select task element 610 to view additional details about the tasks associated with the corresponding content item. For example, when CMS client 214 receives user input selecting task element 610, CMS client 214 can present GUI 700 of FIG. 7.

In some implementations, CMS client 214 can filter project content items based on a corresponding type of content item. For example, when the user selects graphical element 612, CMS client 214 can present all content items associated with the project. When the user selects graphical element 614, CMS client 214 can filter the content items associated with the project so that only content items of a first specific type are presented on GUI 600. When the user selects graphical element 6146 CMS client 214 can filter the content items associated with the project so that only content items of a second specific type are presented on GUI 600. For example, the type for a content item can be determined based on an application that was used to generate the content item. The type for content item can correspond to a media type (e.g., audio, video, text, web page, etc.). The type for a content item can correspond to an extension (e.g., .txt, .mp4, etc.) assigned or associated with the content item.

Figure 7:
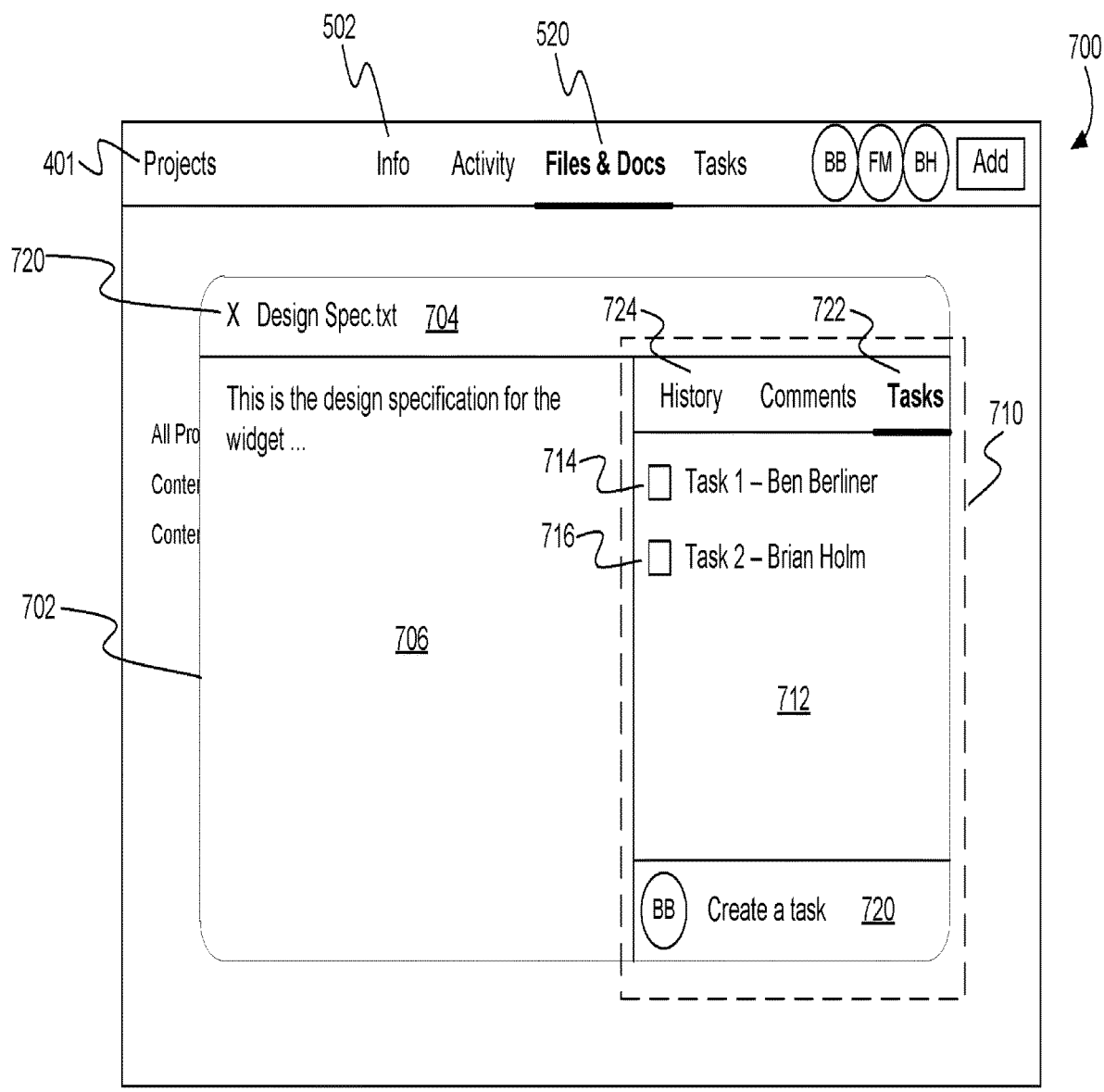
FIG. 7 illustrates an example graphical user interface for presenting a preview of a content item and tasks associated with the content item.

FIG. 7 illustrates an example graphical user interface 700 for presenting a preview of a content item and tasks associated with the content item. For example, GUI 700 can be presented by CMS client 214 in response to a user selecting graphical element 610 of FIG. 6. GUI 700 can be presented by CMS client 214 in response to a user selecting graphical element 708 of FIG. 7.

In some implementations, GUI 700 can include preview element 702. For example, preview element 702 can be a window, overlay, popup, or other graphical element that presents a preview of a selected content item. Preview element 702 can include title element 704 that presents the name or identifier for the selected content item. Preview element 702 can include content preview area 706 that presents a preview (e.g., static image) of the content in the selected content item. For example, if the selected content item includes text, content preview area 706 can present at least some of the text from the selected content item. If the selected content item includes graphics, then content preview area 706 can present the graphics from the selected content item.

In some implementations, GUI 700 can include metadata area 710. For example, metadata area 710 can include (e.g., present) metadata associated with the content item being previewed by preview element 702. In some implementations, when preview element 702 is presented by CMS client 214 in response to receiving input selecting task element 610 from FIG. 6, CMS client 214 can present tasks associated with the corresponding content item within metadata area 710. Alternatively, CMS client 214 can present tasks associated with the corresponding content item within metadata area 710 in response to the user selecting graphical element 722.

In some implementations, metadata area 710 can include task area 712. For example, task area 712 can present tasks (e.g., tasks 714, 716, etc.) associated with the previewed content item. Each task can include an identifier (e.g., name, description, etc.) for the task. Each task can include an identifier for a project member to whom the task is currently assigned.

In some implementations, metadata area 710 can include graphical element 720 for creating a new task. For example, a user can provide text input to graphical element 720 to create a new task. The text input can include expressions (e.g., task expressions) for creating a task, assigning a task to a project member, associating a content item with the task, and/or associating the task with a project. For example, the user can input square brackets (e.g., "[ ]") before text to create a task and assign the task a name, title, or description. For example, the text "[ ] Task 1" can be interpreted by CMS client 214 and/or content management system 106 as a command to create a new task named "Task 1." The user can input the "@" sign before a members name to assign the task to the member. For example, the text "[ ] Task 1 @Frank" can be interpreted by CMS client 214 and/or content management system 106 as a command to create a new task named "Task 1" and assign the task to the project member named "Frank." The user can input the "+" sign before a content item identifier to associate the identified content item with the task. For example, the text "[ ] Task 1 +File1 @Frank" can be interpreted by CMS client 214 and/or content management system 106 as a command to create a new task named "Task 1", associate a content item named "File1" with the task, and assign the task to the project member named "Frank." The user can input the "#" sign before a project identifier to associate the task with the identified project. For example, the text "[ ] Task 1 +File1 @Frank #Project1" can be interpreted by CMS client 214 and/or content management system 106 as a command to create a new task named "Task 1", associate a content item named "File1" with the task, assign the task to the project member named "Frank", and associate the task with the project "Project1." In some implementations, the textual expressions described above can be provided as input to comments in content items, applications, graphical user interfaces, etc., or as text input anywhere else within CMS client 214 or content management system 106 to create new tasks. When a new task is generated and associated with the content item presented in preview element 702, task areas 712 can present the new task. For example, CMS client 214 and/or content management system 106 can store information mapping the relationship between tasks, content items, projects, and/or members so that tasks can be presented to the appropriate members, in the appropriate projects, and in association with the appropriate content items, as described herein.

In some implementations, a user can select graphical element 724 to view comment and/or revision history for the previewed content item. For example, in response to receiving user input selecting graphical element 724m, CMS client 214 can present GUI 800 of FIG. 8.

Figure 8:
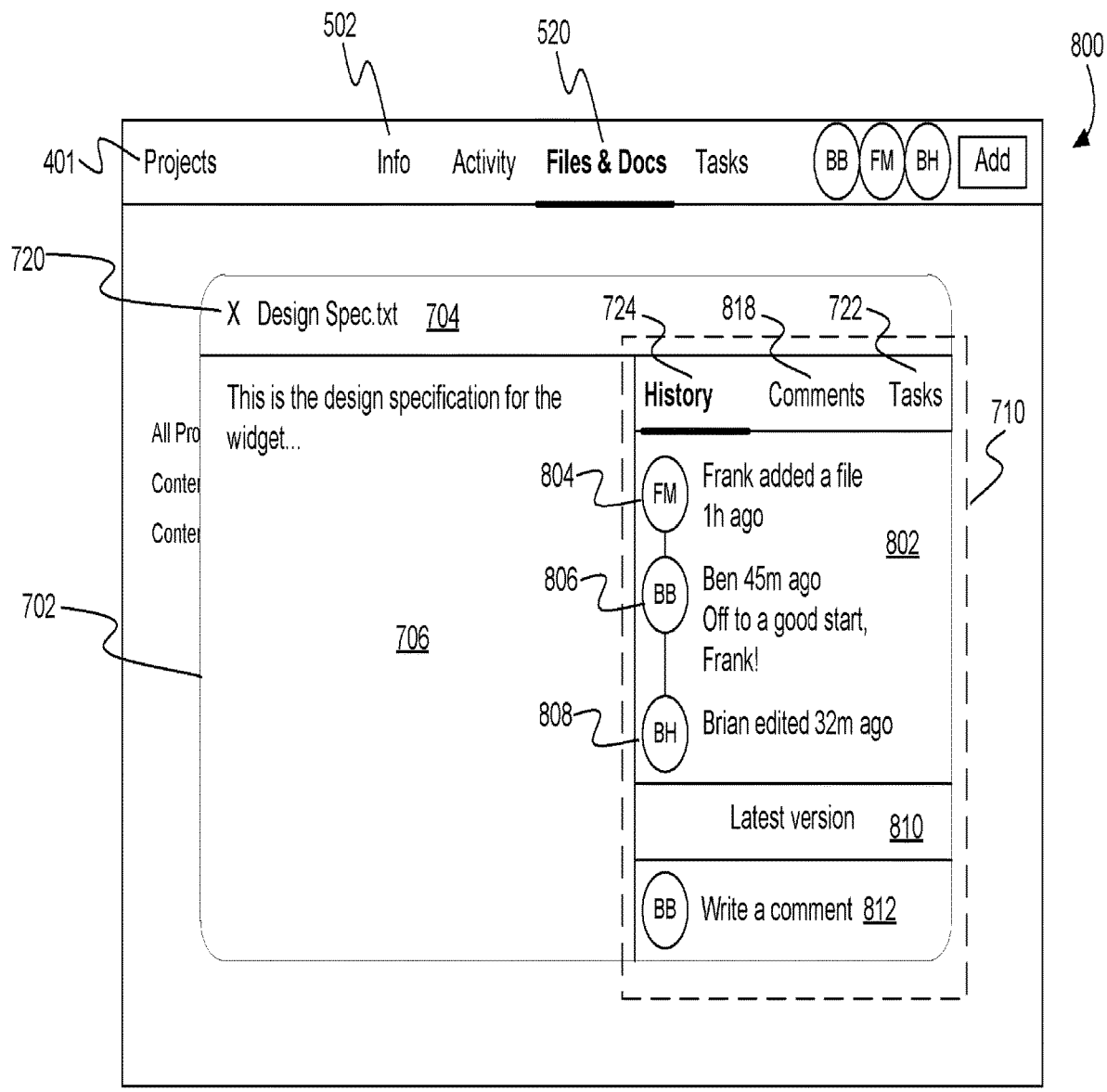
FIG. 8 illustrates a graphical user interface for presenting a content item preview with metadata history.

FIG. 8 illustrates a graphical user interface 800 for presenting a content item preview with metadata history. For example, GUI 800 can be presented by CMS client 214 in response to a user selecting content item 608 presented by GUI 600 and/or any other content item presented by any GUI described herein. GUI 800 can be similar to GUI 700. Like GUI 700, GUI 800 can include preview element 702, title element 704, content element 706, and/or metadata area 710.

However, instead of presenting tasks in metadata area 710, CMS client 214 can present comments and/or revision history information for the previewed content item in metadata area 710. For example, a user can select graphical element 722 to cause CMS client 214 to present tasks in metadata area 710, as described with reference to GUI 700 above. The user can select graphical element 724 to cause CMS client 214 to present comments and revision history in metadata area 710, as illustrated by GUI 800. The user can select graphical element 722 to cause CMS client 214 to present only comments in metadata area 710.

When graphical element 724 is selected, CMS client 214 can present comments and content item revision history information in area 802. For example, area 802 can include revision item 804 indicating that a project member (e.g., "Frank") has added a file (e.g., the previewed content item) to the project and indicating a time (e.g., "1 hour ago") when the file was added to the project. Area 802 can include comment item 806 that presents a comment on the previewed content item, an indication of which project member (e.g., "Ben") submitted the comment, and a time (e.g., "45 m ago") when the comment was written. Area 802 can include revision item 808 indicating that a project member (e.g., "Brian") edited the previewed content item at a time (e.g., "32 m ago"). The items presented in area 802 can be time ordered (e.g., oldest to newest, newest to oldest), for example.

In some implementations, preview element 702 can present previous versions of the previewed content item. For example, when a user selects revision item 804 or revision item 808, preview element 702 can present the corresponding version of the content item in content area 706. For example, when the user selects revision item 804, CMS client 214 can present the original version of the previewed content item in content area 706. When the user selects revision item 808, CMS client 214 can present the edited version of the previewed content item corresponding to revision item 808 in content area 706. When the user wishes to view the current version of the previewed content item, the user can select graphical element 810 to cause CMS client 214 to present the current or latest version of the previewed content item in content area 706.

In some implementations, metadata area 710 can include graphical element 812 for generating a new comment associated with the previewed content item. For example, graphical element 812 can be a text input box or similar graphical element that accepts text input. The user can provide text input to generate a comment for the previewed content item. The comment can be presented in area 802. If the new comment includes task expressions, as described above, the comment can be converted into a task and added to the tasks associated with the previewed content item or another content item, project, member/user, etc., depending on the content of the task expression, as described above. When the user is finished viewing the previewed content item, the user can select graphical element 720 to close preview element 702.

Figure 9:
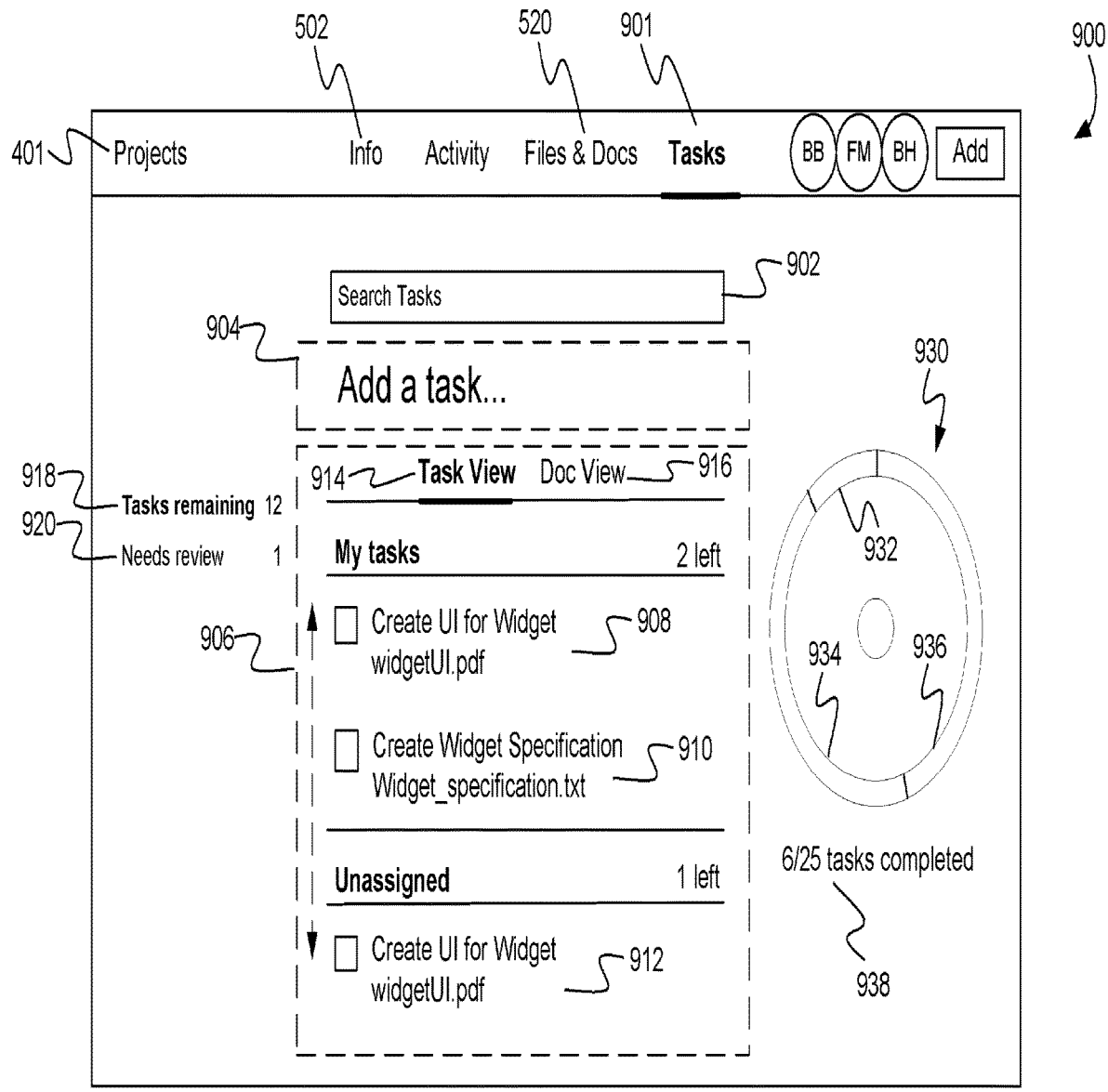
FIG. 9 illustrates an example graphical user interface for managing tasks associated with a project.

FIG. 9 illustrates an example graphical user interface 900 for managing tasks associated with a project. For example, GUI 900 can be presented by CMS client 214 in response to receiving user input selecting graphical element 901 presented by various GUIs described herein. For example, in response to receiving the selection of graphical element 901, CMS client 214 can search managed content database 216 for tasks mapped to the project identifier for the selected project to determine which tasks are associated with the selected project. Alternatively, CMS client 214 can request the tasks associated with the selected project from content management system 106. Content management system 106 can search content storage 160 for tasks mapped to the project identifier for the selected project and return task information describing the tasks to CMS client 214. When CMS client 214 determines or receives the task information for tasks associated with the selected project, CMS client 214 can present the tasks on GUI 900.

In some implementations, GUI 900 can include graphical element 902 for searching for tasks that meet some specified search criteria. For example, graphical element 902 can be a text input control (e.g., text input box). A user can select graphical element 902, provide textual input specifying search parameters, and provide input to cause CMS client 214 to search for tasks that match or correspond to the search parameters. CMS client 214 can then present the tasks that match the search parameters in area 902, as described further below.

In some implementations, GUI 900 can include graphical element 904 for creating a new task. For example, a user can select graphical element 904 (e.g., a text input control) to create a new task. The new task can be created by the user by providing text input that includes task expressions, as described above. The new task can be created by simply providing text input specifying a task name, title, or description. In response to receiving the text input creating a new task, CMS client 214 can generate a new task corresponding to the text input and present the new task in area 906, described further below. When the new task is created, CMS client 214 and/or content management system 106 can store an association (e.g., mapping) between the task, the current project or specified project, content items, and/or project members identified in the task expression, as described above. For example, when CMS client 214 creates a new task, the new task information, including the above mentioned association, can be synchronized with content management system 106 and any member devices using the content management synchronization techniques described above.

In some implementations, GUI 900 can include area 906 for presenting tasks associated with the currently selected project. For example, area 906 can present tasks (e.g., tasks 908 and/or 910) assigned to the current user (e.g., "My Tasks"). Area 906 can present unassigned tasks (e.g., task 912). Area 906 can present tasks assigned to other members of the project. For example, if the current user is a project manager or project leader, then area 906 can present tasks assigned to other members of the team so that the current user can monitor progress on tasks assigned to other users. The user can provide input to area 906 to scroll through the tasks.

In some implementations, a task (e.g. task 908, 910, and/or 912) can include a selectable graphical element (e.g. check box) that a user can select to indicate that a task has been completed. A task can include a name, title, or description for the task. A task can include a representation of a content item associated with the task. A task can include an identifier for a project member to whom the task is assigned. For example, task 908 includes a check box, a title (e.g., "Create UI for Widget"), and a representation of a content item (e.g., "widgetUI.pdf"). For example, the content item can be represented by an identifier for the content item. The identifier can be a link to the content item stored in content management system 106, for example. The user can select the content item representation to view GUI 700 or GUI 800 described above.

In some implementations, area 906 can present a task view of the tasks associated with a project. For example, the user can select graphical element 914 to view a task centric or focused view of tasks for the project, as illustrated by FIG. 9. Alternatively, area 906 can present a document view of the tasks associated with a project. For example, the user can select graphical element 916 to view a content item centric or focused view of tasks for the project. In response to receiving the user selection of graphical element 916, CMS client 214 can present GUI 1000 of FIG. 10.

In some implementations, GUI 900 can present graphical elements 918 and/or 920 for filtering tasks based on status. For example, a user can select graphical element 918 to cause CMS client 214 to present (e.g., only) tasks that have not yet been completed. A user can select graphical element 920 to cause CMS client 214 to present (e.g., only) tasks that need review by the user or other member of the project. For example, the substantive work associated with a task may have been completed by one member and may require review by another member before the task is considered complete. The user can select graphical element 920 to view tasks that need to be reviewed by the user and/or tasks that have been performed by the user that need review by another member of the project.

In some implementations, GUI 900 can include graphical element 930 representing progress made on project tasks. For example, graphical element 930 can be a circle that represents (e.g., all) the tasks in the selected project. The circle can be divided into segments that represent the number of tasks assigned to the user 934, the number of tasks completed by the user 932, and unassigned tasks 936. Each segment can be color coded. For example, tasks associated with the user can be represented in a blue color, while unassigned tasks are represented in an orange color. GUI 900 can include a textual representation of task progress 938 that indicates the number of tasks completed and/or the total number of tasks for the project.

Figure 10:
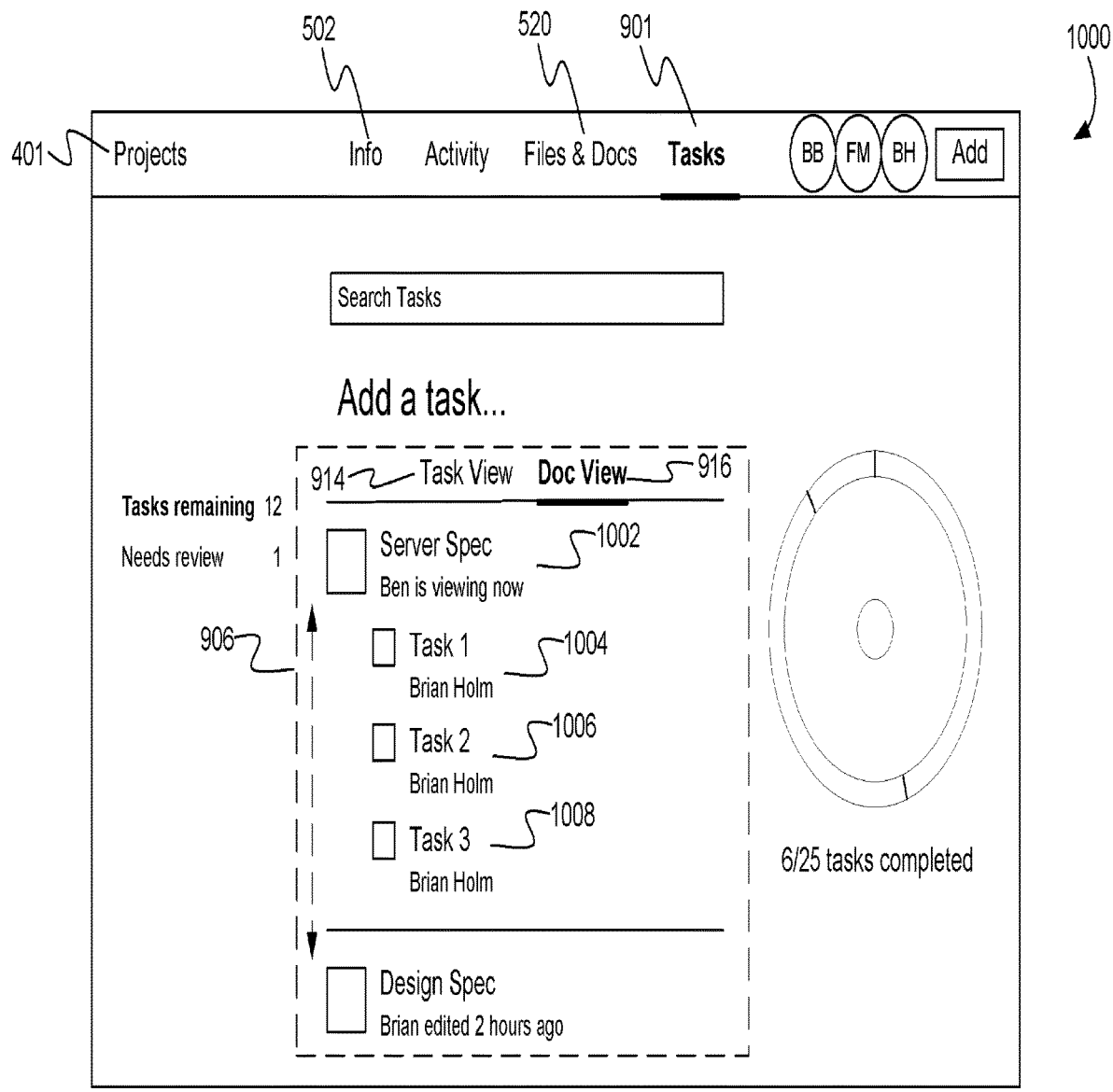
FIG. 10 illustrates an example graphical user interface presenting a content item centric view of project tasks.

FIG. 10 illustrates an example graphical user interface 1000 presenting a content item centric view of project tasks. For example, GUI 1000 can correspond to GUI 900 of FIG. 9. GUI 1000 can be presented by CMS client 214 in response to the user selecting graphical element 916 of FIG. 9. When CMS client 214 receives user input selecting graphical element 916, CMS client can present a content item centric view of project tasks in area 906. For example, instead of presenting a listing of tasks that have content items, as depicted in FIG. 9, CMS client 214 can present a listing of content items that have tasks, as depicted in FIG. 10. Thus, the user can quickly see which tasks are associated with which content items in the project.

In some implementations, area 906 can include graphical element 1002 representing a content item in the selected project. For example, area 906 can present only the content items that have tasks associated with the content items. Area 906 can present only the content items that have tasks assigned to the user. Area 906 can present all content items that have tasks associated with the content items. For example, graphical element 1002 can include an identifier for the corresponding content item and/or status information for the content item. The user can select graphical element 1002 to view the content item, as described above.

In some implementations, CMS client 214 can present tasks associated with a content item. For example, graphical element 1002 can be followed by a list of tasks (e.g., tasks 1004, 1006, 1008) associated with the content item represented by graphical element 1002. Each task can include a name, title, or description of the tasks and/or an identifier for the member responsible for performing the task. The user can select the check box associated with a task to indicate that the task has been completed. The user can select a task to view more information about the task, reassign the task, or perform some other task operation. For example, the user can select a task to view GUI 700 of FIG. 7. In some implementations, the user can provide input to cause CMS client 214 to scroll through the tasks presented in area 906.

Figure 11:
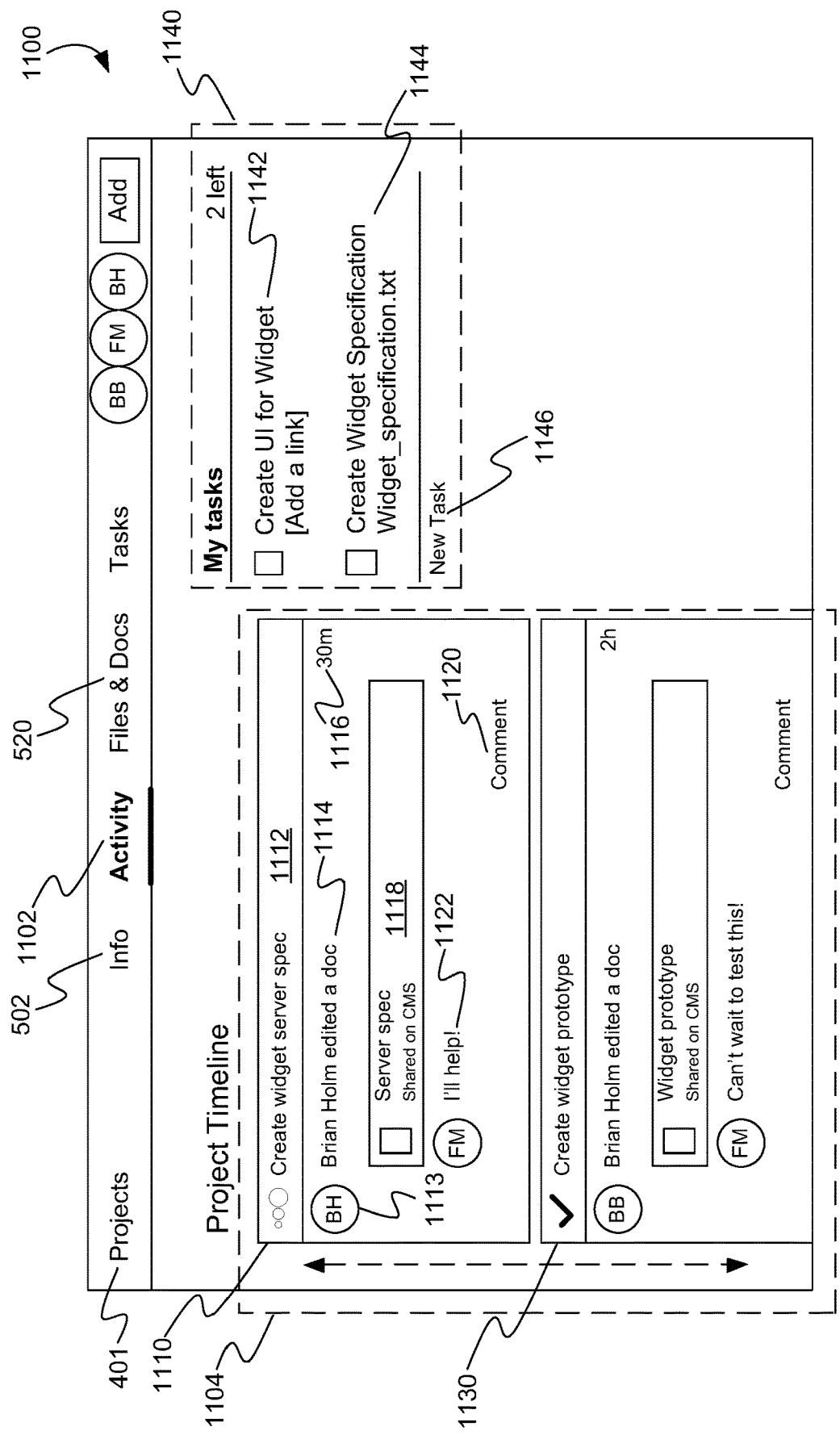
FIG. 11 illustrates an example graphical user interface for presenting a timeline of project activities.

FIG. 11 illustrates an example graphical user interface 1100 for presenting a timeline of project activities. For example, CMS client 214 can present GUI 1100 in response to a user selecting graphical element 1102 on any of the graphical user interfaces described herein. GUI 1100 can present a timeline of activities performed in association with the project. For example, the activities can correspond to tasks performed by members of the project.

In some implementations, GUI 1100 can include project timeline 1104. For example, project timeline can include graphical elements 1110 and/or 1130 representing activities performed in the project. Graphical elements 1110 and/or 1130 can be presented in time order such that the most recent activity is presented at the top of timeline 1104 and older activities are presented below newer activities. Alternatively, newer activities can be presented at the bottom of timeline 1104 and older activities at the top. A user can provide input to cause CMS client 214 and/or GUI 1100 to scroll through timeline 11104.

In some implementations, graphical element 1110 (e.g., and graphical element 1130) can include header 1112. Header 1112 can include a graphical element indicating the status (e.g., in progress, completed, etc.) of the activity. Header 1112 can include an identifier (e.g., name, title, description, etc.) for the task corresponding to the activity. In some implementations, graphical element 1110 can include an indication 1113 of which project member performed the activity. For example, indication 1113 can be a graphical element (e.g., an icon, badge, picture, or other graphic) representing the member. Indication 1113 can be text that identifies the member.

In some implementations, graphical element 1110 can include a description 1114 of the activity performed by the member. For example, description 1114 can indicate that the member edited a content item, viewed a content item, added a content item, or completed a task. Graphical element 1110 can include an indication 1116 of when the activity was performed. For example, indication 1116 can indicate that the activity was performed 30 minutes ago.

In some implementations, graphical element 1110 can include a graphical representation 1118 of a content item associated with the activity. For example, graphical representation 1118 can include a graphic representing the content item and/or text identifying the content item. A user can select graphical representation 1118 to cause CMS client 214 to present a preview of the content item, as described above with reference to FIG. 7 and FIG. 8.

In some implementations, graphical element 1110 can include comments 1122 for the activity. For example, the comments can be comments associated with the corresponding task. The comments can be comments associated with the corresponding content item. A user can create a new comment for the activity (e.g., task) by selecting graphical element 1120 and providing text input to generate a the new comment. The new comment (e.g., comment 1122) can be presented in graphical element 1110.

In some implementations, GUI 1100 can include task area 1140. For example, task area 1140 can present representations of project tasks 1142 and/or 1144 assigned to the user. Each project task can include a name, title, or description of the corresponding task. Each project task can include a representation (e.g., textual or graphical) of a content item corresponding to the task. If the task does not have a corresponding content item, the task can present a selectable element (e.g., "[Add a link]") that allows a user to input or provide a link to a content item for the task, as illustrated by task 1142.

In some implementations, task area 1140 can present a graphical element 1146 for adding a new task to the project. For example, a user can select graphical element 1146 to cause CMS client 214 to present user interface elements for creating a new task for the project. For example, CMS client 214 can generate a new blank task in task area 1140 and the user can provide input to the blank task to define the name, title, or description of the task and/or associate a content item with the task. Alternatively, CMS client 214 can present a text input element and the user can provide textual task expressions to create a new task for the project, as described above.

Figure 12:
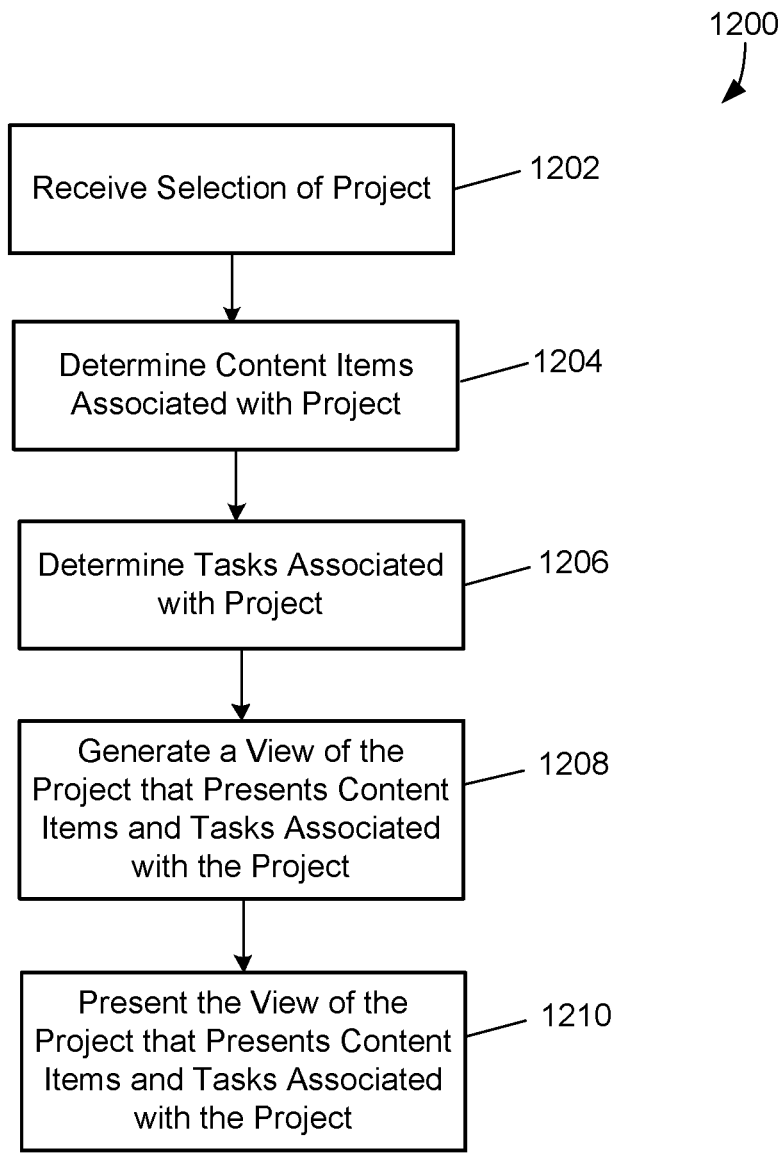
FIG. 12 is a flow diagram of an example process for presenting project content and/or task information.

FIG. 12 is a flow diagram of an example process 1200 for presenting project content and/or task information. For example, process 1200 can be performed by CMS client 214 and/or content management system 106 to present one or more of the graphical user interfaces described above. For example, the description below describes CMS client 214 as performing the steps of the method, however content management system 106 may perform some of the steps to generate a view (e.g., web page) that is delivered to and presented by CMS client 214, as described above.

At step 1202, CMS client 214 can receive a selection of a project. For example, CMS client 214 can present GUI 300 or GUI 400, described above. The user can provide input to select a project to view. In response to receiving the selection of the project, CMS client 214 can present one or more of the graphical user interfaces described above.

At step 1204, CMS client 214 can determine content items associated with the selected project. For example, the selected project can be associated with a project identifier. CMS client 214 can obtain (e.g., search for, request from content management system 106) content items associated with the project identifier. For example, content items can be tagged with the project identifier such that the project identifier is stored in metadata associated with the content item. Content items can be stored in shared project folder associated with the project identifier and CMS client 214 can obtain project content items from the shared folder.

At step 1206, CMS client 214 can determine tasks associated with the project. For example, CMS client 214 and/or content management system 106 can maintain a task database that associates tasks, projects, project members, content items, and/or other information. CMS client 214 can search the task database for tasks associated with the current project to determine tasks associated with the project (e.g., based on associated project identifiers).

At step 1208, CMS client 214 can generate a view of the project that presents content items and tasks associated with the project. For example, CMS client 214 can generate the view based on one or more web pages generated by content management system 106. CMS client 214 can generate the view based on content item information and task information obtained by CMS client 214 from content management system 106 and/or managed content database 216. For example, the view can correspond to one or more of the graphical user interfaces described above.

At step 1210, CMS client 214 can present the view of the project that presents content items and tasks associated with the project. For example, CMS client 214 can present one or more of GUIs 400-1100 described above.

Figure 13:
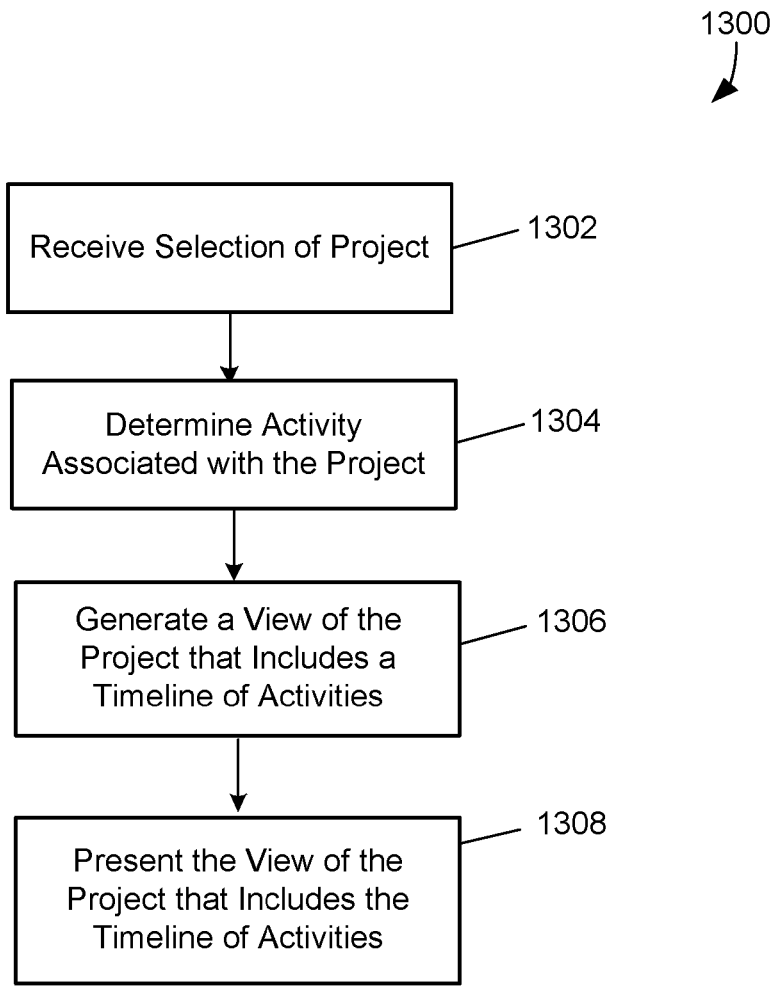
FIG. 13 is a flow diagram of an example process for presenting a project activity timeline.

FIG. 13 is a flow diagram of an example process 1300 for presenting a project activity timeline. For example, process 1300 can be performed by CMS client 214 and/or content management system 106 to present one or more of the graphical user interfaces described above. For example, the description below describes CMS client 214 as performing the steps of the method, however content management system 106 may perform some of the steps to generate a view (e.g., web page) that is delivered to and presented by CMS client 214, as described above.

At step 1302, CMS client 214 can receive a selection of a project. For example, CMS client 214 can present GUI 300 or GUI 400, described above. The user can provide input to select a project to view. In response to receiving the selection of the project, CMS client 214 can present one or more of the graphical user interfaces described above.

At step 1304, CMS client 214 can determine activities associated with the project. For example, CMS client 214 and/or content management system 214 can maintain historical activity data that describes changes and/or activities related to tasks and/or content items associated with the selected project. CMS client 214 can obtain historical data that describes task history and/or content item revision history and generate an activity timeline for the selected project.

At step 1306, CMS client 214 can generate a view of the project that includes the timeline of activities. For example, CMS client 214 can generate GUI 1100 as described above with reference to FIG. 11. CMS client 214 can generate GUI 1100 as a native graphical user interface. CMS client 214 can generate GUI 1100 based on a view (e.g., web page) received from content management system 106.

At step 1308, CMS client 214 can present a view of the project that includes the timeline of activities. For example, CMS client 214 can present GUI 1100 of FIG. 11, as described above.

Figure 14A:
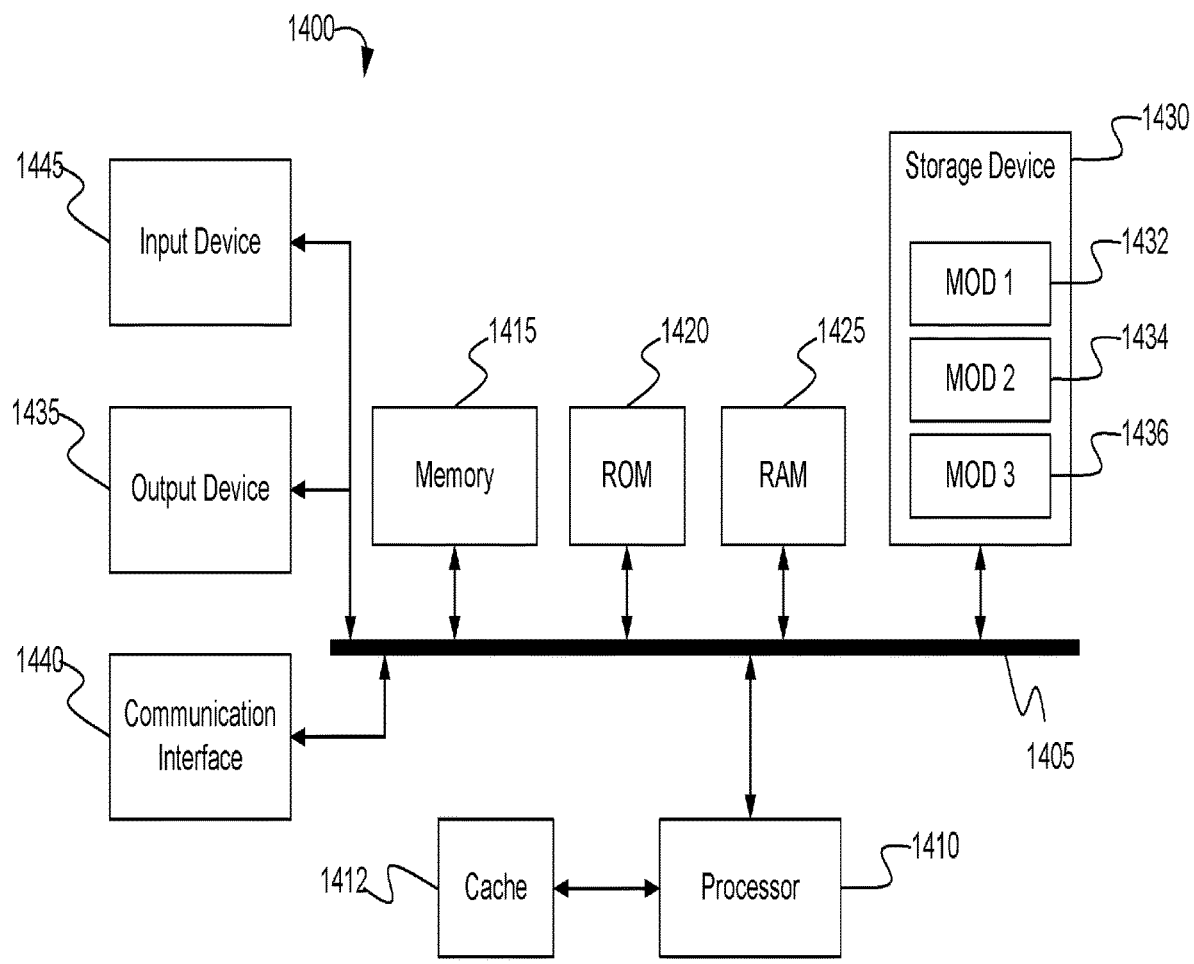
FIG. 14A shows an example system embodiment for implementing various embodiments of the present technology.
Figure 14B:
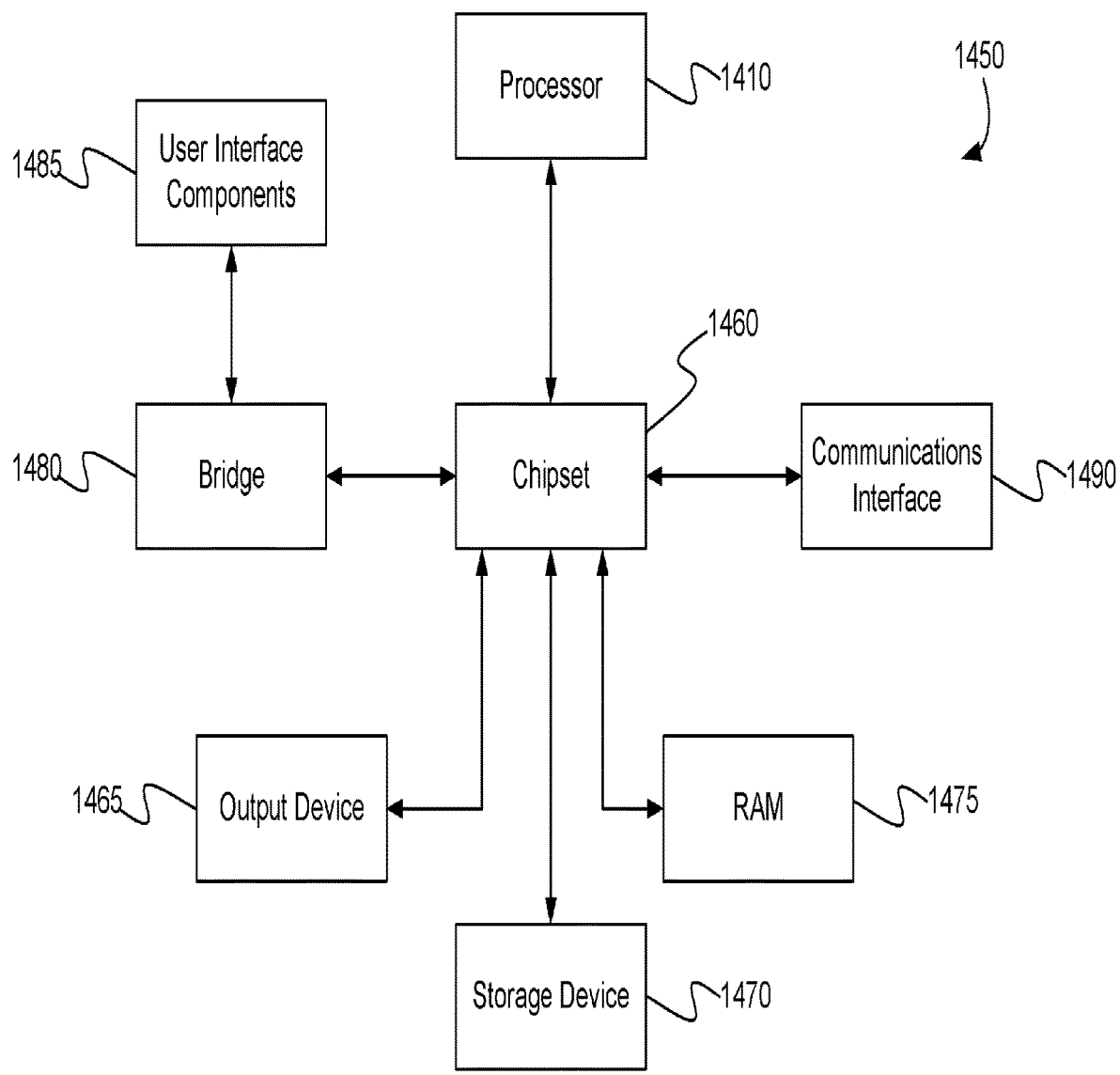
FIG. 14B shows an example system embodiment for implementing various embodiments of the present technology.

FIG. 14A and FIG. 14B show example system embodiments. The more appropriate embodiment will be apparent to those of ordinary skill in the art when practicing the present technology. Persons of ordinary skill in the art will also readily appreciate that other system embodiments are possible.

FIG. 14A illustrates a conventional system bus computing system architecture 1400 wherein the components of the system are in electrical communication with each other using a bus 1405. Example system 1400 includes a processing unit (CPU or processor) 1410 and a system bus 1405 that couples various system components including the system memory 1415, such as read only memory (ROM) 1420 and random access memory (RAM) 1425, to the processor 1410. The system 1400 can include a cache of high-speed memory connected directly with, in close proximity to, or integrated as part of the processor 1410. The system 1400 can copy data from the memory 1415 and/or the storage device 1430 to the cache 1412 for quick access by the processor 1410. In this way, the cache can provide a performance boost that avoids processor 1410 delays while waiting for data. These and other modules can control or be configured to control the processor 1410 to perform various actions. Other system memory 1415 may be available for use as well. The memory 1415 can include multiple different types of memory with different performance characteristics. The processor 1410 can include any general purpose processor and a hardware module or software module, such as module 1 1432, module 2 1434, and module 3 1436 stored in storage device 1430, configured to control the processor 1410 as well as a special-purpose processor where software instructions are incorporated into the processor design. The processor 1410 may essentially be a completely self-contained computing system, containing multiple cores or processors, a bus, memory controller, cache, etc. A multi-core processor may be symmetric or asymmetric.

To enable user interaction with the computing device 1400, an input device 1445 can represent any number of input mechanisms, such as a microphone for speech, a touch-sensitive screen for gesture or graphical input, keyboard, mouse, motion input, speech and so forth. An output device 1435 can also be one or more of a number of output mechanisms known to those of skill in the art. In some instances, multimodal systems can enable a user to provide multiple types of input to communicate with the computing device 1400. The communications interface 1440 can generally govern and manage input and output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 1425, read only memory (ROM) 1420, and hybrids thereof.

The storage device 1430 can include software modules 1432, 1434, 1436 for controlling the processor 1410. Other hardware or software modules are contemplated. The storage device 1430 can be connected to the system bus 1405. In one aspect, a hardware module that performs a particular function can include the software component stored in a computer-readable medium in connection with the necessary hardware components, such as the processor 1410, bus 1405, display 1435, and so forth, to carry out the function.

FIG. 14B illustrates a computer system 1450 having a chipset architecture that can be used in executing the described method and generating and displaying a graphical user interface (GUI). Computer system 1450 is an example of computer hardware, software, and firmware that can be used to implement the disclosed technology. System 1450 can include a processor 1410, representative of any number of physically and/or logically distinct resources capable of executing software, firmware, and hardware configured to perform identified computations. Processor 1410 can communicate with a chipset 1460 that can control input to and output from processor 1410. In this example, chipset 1460 outputs information to output 1465, such as a display, and can read and write information to storage device 1470, which can include magnetic media, and solid state media, for example. Chipset 1460 can also read data from and write data to RAM 1475. A bridge 1480 for interfacing with a variety of user interface components 1485 can be provided for interfacing with chipset 1460. Such user interface components 1485 can include a keyboard, a microphone, touch detection and processing circuitry, a pointing device, such as a mouse, and so on. In general, inputs to system 1450 can come from any of a variety of sources, machine generated and/or human generated.

Chipset 1460 can also interface with one or more communication interfaces 1490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1410 analyzing data stored in storage 1470 or 1475. Further, the machine can receive inputs from a user via user interface components 1485 and execute appropriate functions, such as browsing functions by interpreting these inputs using processor 1410.

It can be appreciated that example systems 1400 and 1450 can have more than one processor 1410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
  receiving, by a computing system from a user, a selection of a project managed by a content management system, the project associated with a project identifier;
  determining, by the computing system, activities associated with the project by obtaining historical data that describes task history and revision history for the project;
  generating, by the computing system, a view of the project that includes a timeline of activities based on the task history and the revision history, the timeline comprising a plurality of graphical elements, each graphical element representing an activity performed in the project, each graphical element comprising a status of the activity, one or more tasks associated with the activity, one or more content items associated with the activity, and an indication of one or more project members associated with the activity;
  causing, by the computing system, the timeline of activities associated with the project to be presented on a display;
  identifying, by the computing system, a new activity with respect to the project;
  in response to identifying the new activity, generating, by the computing system, a new graphical element corresponding to the new activity, the new graphical element comprising one or more of a status of the new activity, one or more tasks associated with the new activity, one or more content items associated with the new activity, or an indication of one or more project members associated with the new activity;
  updating, by the computing system, the timeline of activities to include the new graphical element in a position on the timeline that denotes its relative time ordering with respect to the plurality of graphical elements; and
  causing, by the computing system, the updated timeline of activities associated with the project to be presented on the display.

2. The method of claim 1, wherein generating, by the computing system, the view of the project that includes the timeline of activities comprises:
  for each graphical element, generating a description of the activity corresponding to the graphical element.

3. The method of claim 1, wherein generating, by the computing system, the view of the project that includes the timeline of activities comprises:
  for each graphical element, generating a further indication of when the activity corresponding to the graphical element occurred.

4. The method of claim 1, further comprising:
  receiving, by the computing system via the via the timeline, a request to preview a content item associated with a graphical element; and
  responsive to receiving the request, generating, by the computing system, a preview of the content item to be presented on the display.

5. The method of claim 1, wherein generating, by the computing system, the view of the project that includes the timeline of activities comprises:
  for each graphical element, generating a graphical representation of a comment associated with the activity corresponding to the graphical element.

6. The method of claim 1, further comprising:
  receiving, by the computing system, a comment to be associated with an activity; and
  responsive to receiving the comment, adding, by the computing system, the comment to the graphical element corresponding to the activity.

7. The method of claim 1, further comprising:
  generating, by the computing system, a task area to be included in the view, the task area comprising a subset of tasks assigned to the user.

8. A non-transitory computer readable medium comprising one or more sequences of instructions which, when executed by one or more processors, cause a computing system to perform operations comprising:
  identifying, by the computing system, a project managed by a content management system, the project associated with a project identifier;
  determining, by the computing system, activities associated with the project by obtaining historical data that describes task history and revision history for the project;
  generating, by the computing system, a view of the project that includes a timeline of activities based on the task history and the revision history, the timeline comprising a plurality of graphical elements, each graphical element representing an activity performed in the project, each graphical element comprising a status of the activity, one or more tasks associated with the activity, one or more content items associated with the activity, and an indication of one or more project members associated with the activity;
  causing, by the computing system, the timeline of activities associated with the project to be presented on a display;
  identifying, by the computing system, a new activity with respect to the project;
  in response to identifying the new activity, generating, by the computing system, a new graphical element corresponding to the new activity, the new graphical element comprising one or more of a status of the new activity, one or more tasks associated with the new activity, one or more content items associated with the new activity, or an indication of one or more project members associated with the new activity;
  updating, by the computing system, the timeline of activities to include the new graphical element in a position on the timeline that denotes its relative time ordering with respect to the plurality of graphical elements; and causing, by the computing system, the updated timeline of activities associated with the project to be presented on the display.

9. The non-transitory computer readable medium of claim 8, wherein generating, by the computing system, the view of the project that includes the timeline of activities comprises:

for each graphical element, generating a description of the activity corresponding to the graphical element.

10. The non-transitory computer readable medium of claim 8, wherein generating, by the computing system, the view of the project that includes the timeline of activities comprises:

for each graphical element, generating a further indication of when the activity corresponding to the graphical element occurred.

11. The non-transitory computer readable medium of claim 8, further comprising:

receiving, by the computing system via the timeline, a request to preview a content item associated with a graphical element; and responsive to receiving the request, generating, by the computing system, a preview of the content item to be presented on the display.

12. The non-transitory computer readable medium of claim 8, wherein generating, by the computing system, the view of the project that includes the timeline of activities comprises:

for each graphical element, generating a graphical representation of a comment associated with the activity corresponding to the graphical element.

13. The non-transitory computer readable medium of claim 8, further comprising:

receiving, by the computing system, a comment to be associated with an activity; and responsive to receiving the comment, adding, by the computing system, the comment to the graphical element corresponding to the activity.

14. The non-transitory computer readable medium of claim 8, further comprising:

generating, by the computing system, a task area to be included in the view, the task area comprising a subset of tasks assigned to a particular user.

15. A system, comprising:

one or more processors; and a memory having programming instructions stored thereon, which, when executed by the one or more processors, causes the system to perform operations comprising:

receiving, from a user, a selection of a project managed by a content management system, the project associated with a project identifier;

determining activities associated with the project by obtaining historical data that describes task history and revision history for the project;

generating a view of the project that includes a timeline of activities based on the task history and the revision history, the timeline comprising a plurality of graphical elements, each graphical element representing an activity performed in the project, each graphical element comprising a status of the activity, one or more tasks associated with the activity, one or more content items associated with the activity, and an indication of one or more project members associated with the activity;

causing the timeline of activities associated with the project to be presented on a display;

identifying, by a computing system, a new activity with respect to the project;

in response to identifying the new activity, generating, by the computing system, a new graphical element corresponding to the new activity, the new graphical element comprising one or more of a status of the new activity, one or more tasks associated with the new activity, one or more content items associated with the new activity, or an indication of one or more project members associated with the new activity;

updating, by the computing system, the timeline of activities to include the new graphical element in a position on the timeline that denotes its relative time ordering with respect to the plurality of graphical elements; and causing, by the computing system, the updated timeline of activities associated with the project to be presented on the display.

16. The system of claim 15, wherein generating the view of the project that includes the timeline of activities comprises:

for each graphical element, generating a description of the activity corresponding to the graphical element.

17. The system of claim 15, wherein generating the view of the project that includes the timeline of activities comprises:

for each graphical element, generating a further indication of when the activity corresponding to the graphical element occurred.

18. The system of claim 15, wherein the operations further comprise:

receiving, via the timeline, a request to preview a content item associated with a graphical element; and responsive to receiving the request, generating a preview of the content item to be presented on the display.

19. The system of claim 15, wherein generating the view of the project that includes the timeline of activities comprises:

for each graphical element, generating a graphical representation of a comment associated with the activity corresponding to the graphical element.

20. The system of claim 15, wherein the operations further comprise:

receiving a comment to be associated with an activity; and responsive to receiving the comment, adding the comment to the graphical element corresponding to the activity.

* * * * *